United States Patent
Zhang et al.

(10) Patent No.: US 9,599,744 B2
(45) Date of Patent: Mar. 21, 2017

(54) METHOD FOR PARSING AND CALCULATING PERFORMANCE OF SATELLITE GRAVITY FIELD MEASUREMENT BY LOW-TO-LOW SATELLITE-TO-SATELLITE TRACKING

(71) Applicant: TSINGHUA UNIVERSITY, Beijing (CN)

(72) Inventors: Yulin Zhang, Beijing (CN); Zhaokui Wang, Beijing (CN); Hongwei Liu, Beijing (CN); Li Fan, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 15/025,560

(22) PCT Filed: Oct. 17, 2013

(86) PCT No.: PCT/CN2013/001264
§ 371 (c)(1),
(2) Date: Mar. 29, 2016

(87) PCT Pub. No.: WO2015/042754
PCT Pub. Date: Apr. 2, 2015

(65) Prior Publication Data
US 2016/0231458 A1    Aug. 11, 2016

(30) Foreign Application Priority Data
Sep. 29, 2013  (CN) .......................... 2013 1 0454595

(51) Int. Cl.
*G01V 7/16* (2006.01)
*G01V 7/06* (2006.01)
(Continued)

(52) U.S. Cl.
CPC ................ *G01V 7/16* (2013.01); *G01S 19/24* (2013.01); *G01V 7/00* (2013.01); *G01V 7/06* (2013.01)

(58) Field of Classification Search
CPC ... G01V 7/16; G01V 7/06; G01V 7/00; G01S 19/33; G01S 19/28; G01S 19/26; G01S 19/23–19/24; G01S 19/00
See application file for complete search history.

(56) References Cited

FOREIGN PATENT DOCUMENTS

| CN | 102854540 A | 1/2013 |
|---|---|---|
| CN | 102998713 B | 1/2015 |

(Continued)

OTHER PUBLICATIONS

Jeongrae Kim, Simulation Study of a Low-Low Satellite-to-Satellite Tracking Mission, May 2000, Ph. D. Degree Dissertation, University of Texas at Austin, 289 pp.*

(Continued)

*Primary Examiner* — Toan Le (57) ABSTRACT

A method for calculating performance of satellite gravity field measurement by low-to-low satellite-to-satellite tracking, includes: acquiring parameters of gravity satellite system; calculating an effect of satellite loads on the power spectrum of nonspherical perturbation potential, so as to obtain an degree error variance; comparing degree error variance with degree variance given by Kaula Rule, and when degree error variance equals degree variance, considering that the highest degree of gravity field measurement is obtained, calculating geoid degree error and its accumulative error, gravity anomaly degree error and its accumulative error, so as to obtain the performance of satellite gravity field measurement by low-to-low satellite-to-satellite tracking. The method is capable of evaluating gravity field measurement performance quickly and effectively, obtaining a rule of effects of the gravity satellite system parameters on the gravity field measurement performance, so as to avoid shortcoming caused by numerical simulation.

5 Claims, 3 Drawing Sheets

(51) Int. Cl.
    *G01S 19/24*     (2010.01)
    *G01V 7/00*     (2006.01)

(56) References Cited

FOREIGN PATENT DOCUMENTS

| | | |
|---|---|---|
| CN | 103091721 B | 3/2015 |
| CN | 103093101 B | 8/2015 |
| CN | 102636818 B | 11/2015 |

OTHER PUBLICATIONS

Tsoulis et al., Band-Limited Analysis of Current Satellite-to-Satellite Tracking, Gradiometery and Combined Earth Gravity Models, Apr. 21, 2013, Surv. Geophys, pp. 375-394.*

Ning et al., Establishment and Analysis of the Spectral Relationship Between Range-Rate and Gravity Potential Based on Energy Conservation, Jun. 2009, Geo-Spatial Information Science, vol. 12, Issue 2, pp. 79-84.*

Cai L, Zhou Z B, Zhou Z, et al. Spectral analysis for recovering the Earth's gravity potential by satellite gravity gradients Chinese J. Geophys (in Chinese, 2012, 55(5):1565-1571, doi: 10 6038/j.issn 0001-5733. 2012. 05. 014.

\* cited by examiner

METHOD FOR PARSING AND CALCULATING PERFORMANCE OF SATELLITE GRAVITY FIELD MEASUREMENT BY LOW-TO-LOW SATELLITE-TO-SATELLITE TRACKING

CROSS REFERENCE OF RELATED APPLICATION

This is a U.S. National Stage under 35 U.S.C 371 of the International Application PCT/CN2013/001264, filed Oct. 17, 2013, which claims priority under 35 U.S.C. 119(a-d) to CN201310454595.3, filed Sep. 29, 2013.

BACKGROUND OF THE PRESENT INVENTION

Field of Invention

The present invention relates to the technical field of satellite gravity field measurement, and more particularly to a method for parsing and calculating performance of satellite gravity field measurement by low-to-low satellite-to-satellite tracking, which is applied for parameter design of a gravity field measurement satellite system by low-to-low satellite-to-satellite tracking.

Description of Related Arts

As a basic physical field of the earth, gravitation field is an important application in earth science research, land resource exploration and geological disaster forecast, and thus the gravitation field has always been an essential issue in geodesy. With the developments of space technology, satellite gravity field measurement attracts more and more attention due to the unique advantages of high coverage, all weather, and without affection by geopolitics and geographical environments. The satellite gravity field measurement has obtained substantial progress in theoretical research and engineering practice and become the most effective way to obtain the global gravity field model[1,2].

Depending on differences in data observed, the gravity field measurement is classified by three principles of orbit perturbation, low-to-low satellite-to-satellite tracking and gravity gradient[3], wherein the orbit perturbation principle is suitable for low-order gravity field measurement which has main observation data of a gravity gradient orbit; the low-to-low satellite-to-satellite tracking principle is suitable for a medial-to-high order gravity field measurement which has main observation data of a distance between two low earth orbit satellites and a change rate thereof; and the gravity gradient principle is suitable for a high-order gravity field measurement which has main observation data of gravity gradient value. The gravity satellites which are successfully implemented or under developed all adopts the measurement principles mentioned above or a combination thereof. E.g., CHAMP utilizes the orbit perturbation principle to recover low-order gravity field; GRACE Follow-on and NGGM satellites utilize both orbit perturbation principle and low-to-low satellite-to-satellite tracking principle to recover medial-to-high order gravity field; and GOCE respectively utilizes orbit perturbation principle and low-to-low satellite-to-satellite tracking principle to recover the low gravity field and the high gravity field. Though, the three principles are respectively suitable for different frequency band of gravity field measurement, the effective order and accuracy of the gravity field measurement are mainly depends on load indicators of the gravity satellite. Under the medial or high order gravity field measurement by low-to-low satellite tracking and gravity gradient orbit, analyzing from the current load performance indicator, the low-to-low tracking measurement is absolutely capable of reaching or even exceeding measurement level of gravity gradient. Therefore, the symposium named "Measurement of satellite gravity field in the future" held in 2007 in Holland decided that the subsequent international gravity satellite continues adopting the low-to-low satellite-to-satellite tracking manner, and that parameters of the system are considered to be improved to increase the measurement performance of the gravity field.

In the conventional design of orbit parameters and loading parameters of gravity field measurement system by low-to-low satellite-to-satellite tracking, a numerical simulation method is mainly utilized to analyze the impact of system parameters on measurement performance of gravity field, so as to further determine design parameters of the system. However, the simulation of gravity field measurement is in high demand of performance of computers, and calculation time lasts very long, which is not conductive to analysis of influence rule of the system parameters on the gravity field measurement, and not convenient for the optimal design of system parameters. In order to overcome the shortcoming, based on the principle of conservation of energy, the present invention establishes an analytical method for gravity field measurement performance by low-to-low satellite-to-satellite tracking, so as to obtain gravity field measurement performances such as an effective order of the gravity field measurement, a geoid error and gravity anomaly error, and determine the influence rule of the system parameters on the gravity field measurement. Thus, the present invention has great guiding significance on parameter design of gravity satellite system by low-to-low satellite-to-satellite tracking.

REFERENCES

[1] Jinsheng ning, Following the Development of the World, Devoting to the Study on the Earth Gravity Field. Gemomatics and Information Science of Wuhan University, 2001, 26(6): 471-474.

[2] Jinsheng ning, THE SATELLITE GRAVITY SURVEYING TECHNOLOGY AND RESEARCH OF EARTH'S GRAVITY FIELD, JOURNAL OF GEODESY AND GEODYNAMICS, 2002, 22(1): 1-5.

[3] Zhenfenggu, Hongwei Liu, Zhaokui Wang, Yulin Zhang, Analysis for satellite gravity field measurement based on relative weight of gravitational coefficients, Progress in Geophysics, 2013, 28(1): 17-23.

SUMMARY OF THE PRESENT INVENTION

Targeting at a gravity field measurement satellite system by low-to-low satellite to satellite tracking, parsing relationships between gravity field measurement performances and satellite system parameters;

wherein the gravity field measurement performances comprise: a gravity field measurement valid order, a geoid error and a gravity anomaly error; and the satellite system parameters comprise: a satellite orbit height, an inter-satellite distance, an inter-satellite change rate measurement precision, an orbit determination precision and a non-gravitational interference, a measurement data sampling interval and a service period. The method of the present invention is capable of rapidly calculating measurement performances of gravity field measurement performance by the low-to-low satellite-to-satellite, so as to analyzing an effective rule of the system parameters on the gravity field measurement performance and to guide an optimal design of the system parameters of the gravity field measurement performance by low-to-low satellite-to-satellite tracking.

Accordingly, in order to achieve the object mentioned above, a technical solution adopted by the present invention is as follows.

A method for parsing and calculating performance of satellite gravity field measurement by low-to-low satellite-to-satellite tracking, comprises following steps of:

step (1): acquiring at least one parameter of a gravity satellite system by low-to-low satellite-to-satellite tracking;

step (2): according to the parameter of the gravity satellite system by low-to-low satellite-to-satellite tracking, calculating an effect of a measuring error of a gravity satellite load on a power spectrum of a nonspherical perturbation potential of earth gravity, so as to obtain an degree error variance of a potential coefficient in a gravity field recovery model;

step (3): comparing the degree error variance of the potential coefficient in the gravity field recovery model with an degree variance of a potential coefficient given by Kaula Rule, wherein with an increase of an order of the gravity field recovery model, the degree error variance gradually increases and the degree variance gradually decreases; when the degree error variance is equal to the degree variance, considering that a maximum valid order of the gravity field measurement is obtained;

step (4): according to the degree error variance of the gravity field recovery model, calculating a geoid-order error and an accumulative error of the geoid-order error, an gravity-anomaly order error and an accumulative error of the gravity-anomaly order error of the gravity field recovery model; and step (5): summarizing the valid order of the gravity field measurement, the geoid-order error and the accumulative error of the geoid-order error, and the gravity-anomaly order error and the accumulative error of the gravity-anomaly order error, so as to obtain the performance of satellite gravity field measurement by low-to-low satellite-to-satellite tracking.

Preferably, in the step (1), the parameter of the gravity satellite system by low-to-low satellite-to-satellite tracking is selected from but not limited to the group consisting of at least one orbit parameter of the gravity satellite system and at least one load indicator of the gravity satellite system;

wherein the orbit parameter of the gravity satellite system is selected from the group consisting of a maximum valid order of the gravity field recovery $N_{max}$, a gravity-anomaly order error $\Delta_n$ of an nth order, a geoid-order accumulative error $\Delta$ of the nth order, a gravity-anomaly order error $\Delta g_n$ of the nth order and a gravity-anomaly accumulative error $\Delta g$ of the nth order;

the parameter of the gravity satellite system is selected from the group consisting of a gravity satellite orbit height h and an included angle $\theta_0$ of satellite-to-satellite geocentric vectors, the load indicator of the gravity satellite system is selected from the group consisting of an inter-satellite range change rate measurement error $(\Delta \dot{\rho})_m$, a satellite orbit determining position error $(\Delta r)_m$, a non-gravitational interference $\Delta F$, an inter-satellite range rate data sampling interval $(\Delta t)_{\Delta \dot{\rho}}$, satellite orbit position data sampling interval $(\Delta t)_{\Delta r}$ and a gravity field measurement service life T.

Preferably, the step (2) specifically comprises steps of:

establishing an analytic formula of a low-to-low satellite-to-satellite tracking gravity field measurement degree error variance $\delta \sigma_n^2$ of a potential coefficient:

$$\delta \sigma_n^2 = \frac{1}{2n+1} \sum_{k=0}^{n} \left[ (\delta \overline{C}_{nk})^2 + (\delta \overline{S}_{nk})^2 \right] =$$

$$\frac{1}{\sum_{k=0}^{n} \left[ \begin{array}{c} B_1(r_0, n, k, \theta_0) + \\ B_2(r_0, n, k, \theta_0) + B_3(r_0, n, k, \theta_0) \end{array} \right]} \times \frac{1}{2n+1}$$

$$\frac{2(n+1)r_0^{2n}}{\pi \mu^2 T a_e^{2n-2}} \left[ \begin{array}{c} -D\sqrt{\left( \frac{(\Delta F)^2 T_{arc}^4}{36}(\Delta t)_{\Delta F} + (\Delta r)_m^2 (\Delta t)_{\Delta r} \right) f_{\delta r}(n)} + \\ \sqrt{\frac{\mu}{r_0}} \sqrt{\left( \frac{(\Delta F)^2 T_{arc}^2}{4}(\Delta t)_{\Delta F} + (\Delta \dot{\rho})_m^2 (\Delta t)_{\Delta \dot{\rho}} \right) f_{\delta \dot{\rho}}(n)} \end{array} \right]^2$$

wherein:

$$\begin{cases} B_1(r_0, n, k, \theta_0) = A_n^2(n-1, k, \theta_0) + \\ \left( \frac{a_e}{r_0} \right) |A_n(n-1, k, \theta_0) A_n(n, k, \theta_0)| + \\ \left( \frac{a_e}{r_0} \right)^2 |A_n(n-1, k, \theta_0) A_n(n+1, k, \theta_0)| \\ B_2(r_0, n, k, \theta_0) = \left( \frac{a_e}{r_0} \right)^2 A_n^2(n, k, \theta_0) + \\ \left( \frac{a_e}{r_0} \right) |A_n(n-1, k, \theta_0) A_n(n, k, \theta_0)| + \\ \left( \frac{a_e}{r_0} \right)^3 |A_n(n, k, \theta_0) A_n(n+1, k, \theta_0)| \\ B_3(r_0, n, k, \theta_0) = \left( \frac{a_e}{r_0} \right)^4 A_n^2(n+1, k, \theta_0) + \\ \left( \frac{a_e}{r_0} \right)^2 |A_n(n-1, k, \theta_0) A_n(n+1, k, \theta_0)| + \\ \left( \frac{a_e}{r_0} \right)^3 |A_n(n, k, \theta_0) A_n(n+1, k, \theta_0)| \end{cases}$$

$$A_n(l, k, \theta_0) = \delta_k \int_0^\pi [\overline{P}_{lk}(\cos(\theta+\theta_0)) - \overline{P}_{lk}(\cos\theta)] \overline{P}_{nk}(\cos\theta) \sin\theta d\theta$$

$$\delta_k = \begin{cases} 2, & k=0 \\ 1, & k \neq 0 \end{cases}$$

$$D = K \left( \frac{\cos\frac{\theta_0}{2}}{2} - \frac{4}{3} \right) \frac{\mu \sin\theta_0}{r_0^4}$$

$$f_{\delta r}(n) = \sum_{k=0}^{n} \int_0^\pi [\overline{P}_{nk}(\cos\theta)]^2 \cos^2(\theta+\xi) \sin^2\theta d\theta = \frac{3}{8}(2n+1)\pi$$

$$f_{\delta \dot{\rho}}(n) = \left( n + \frac{1}{2} \right) \pi$$

$$r_0 = a_e + h$$

wherein $\delta \sigma_n^2$ is an degree error variance of a geopotential coefficient of the gravity field recovery model, $r_0$ is a geocentric range of a satellite, $\theta_0$ is a geocentric vector included angle, $\alpha_e$ is an earth average radius, $\mu$ is a product of a gravitation constant and an earth mass, h is the gravity satellite orbit height, $T_{arc}$ is an integral arc length, $\Delta F$ is non-gravitational interference, $(\Delta t)_{\Delta F}$ is non-gravitational interference data interval, $(\Delta r)_m$ is a satellite orbit determination position error, $(\Delta t)_{\Delta r}$ is a satellite orbit data sampling interval, $(\Delta\dot{\rho})_m$ is an inter-satellite range change rate measurement error, $(\Delta t)_{\Delta\dot{\rho}}$ is an inter-satellite range change rate sampling interval, T is the gravity field measurement service life.

Preferably, value of a coefficient K and a phase $\xi$ is respectively:

$$K = 1.3476 \times 10^{11} \text{m}^2, \xi = -\frac{\pi}{2}.$$

Preferably, according to a preferred embodiment, if the gravity satellite system measures non-gravitational interference by low-to-low satellite-to-satellite tracking, $(\Delta t)_{\Delta F}$ is a non-gravitational interference measurement interval; if the gravity satellite system suppresses non-gravitational interference by low-to-low satellite-to-satellite tracking, $(\Delta t)_{\Delta F}$ is a non-gravitational interference suppression interval.

Preferably, the step (3) specifically comprises a step of establishing a maximum valid order $N_{max}$ of the gravity field measurement, which meets a formula of:

$$\delta\sigma^2_{N_{max}} = \frac{1}{2N_{max}+1} \frac{1.6 \times 10^{-10}}{N^3_{max}}.$$

Preferably, the step (4) specifically comprises:
establishing the geoid-order error corresponding to an nth order:

$$\Delta_n = a_e\sqrt{(2n+1)\delta\sigma_n^2},$$

and/or
establishing the geoid accumulative error corresponding to the nth order:

$$\Delta = \sqrt{\sum_{k=2}^{n}(\Delta_k)^2},$$

and/or
establishing the gravity-anomaly order error corresponding to the nth order:

$$\Delta g_n = \frac{\mu}{a_e^2}(n-1)\sqrt{(2n+1)\delta\sigma_n^2};$$

and/or
establishing the gravity-anomaly accumulative error corresponding to the nth order.

The method for parsing and calculating performance of satellite gravity field measurement by low-to-low satellite-to-satellite tracking of the present invention comprises four parts, which are respectively acquiring at least one parameter of a gravity satellite system by low-to-low satellite-to-satellite tracking, calculating a valid order of the gravity field measurement, determining a geoid-order error and a geoid-order accumulative error, and determining a gravity-anomaly order error and a gravity-anomaly order accumulative error. Acquiring at least one parameter of a gravity satellite system by low-to-low satellite-to-satellite tracking is to obtain parameters such as a satellite orbit height, an inter-satellite distance, an inter-satellite change rate measurement precision, an orbit determination precision and a non-gravitational interference, a measurement data sampling interval and a service period, so as to provide input parameters for the gravity field performance calculation. Calculating a valid order of the gravity field measurement means calculating an order geopotential coefficient error variance of the recovery gravity field model by a parsing and analyzing formula of the gravity field measurement performance according to the gravity satellite system parameters by low-to-low satellite-to-satellite tracking; and then comparing the degree error variance with a geopotential coefficient order error provided by Kaula rule. When the degree error variance is equal to the degree variance, considering that a maximum valid order of the gravity field measurement is obtained. Determining the geoid order error and the accumulative error thereof means obtaining the geoid order error and the accumulative error in a valid range unitizing a geoid order formula according to an error variance of the recovery gravity field model in a previous step. Determining an error of gravity anomaly and an accumulative error of gravity anomaly refers to obtaining the error of gravity anomaly and the accumulative error of gravity anomaly in a valid range utilizing a gravity anomaly calculating formula according to an degree error variance of geopotential coefficient of the recovery gravity field model.

An implement step of the method for parsing and calculating performance of satellite gravity field measurement by low-to-low satellite-to-satellite tracking comprises following steps of:

step (1): acquiring at least one parameter of a gravity satellite system by low-to-low satellite-to-satellite tracking comprising: a satellite orbit height, an inter-satellite distance, an inter-satellite change rate measurement precision, an orbit determination precision and a non-gravitational interference, a measurement data sampling interval and a service period;

step (2): according to the parameter of the gravity satellite system by low-to-low satellite-to-satellite tracking, calculating an effect of a measuring error of a gravity satellite load on a power spectrum of a nonspherical perturbation potential of earth gravity, so as to obtain an degree error variance of a potential coefficient in a gravity field recovery model;

step (3): comparing the degree error variance of the potential coefficient in the gravity field recovery model with an degree variance of a potential coefficient given by Kaula Rule, wherein with an increase of an order of the gravity field recovery model, the degree error variance gradually increases and the degree variance gradually decreases; when the degree error variance is equal to the degree variance, considering that a maximum valid order of the gravity field measurement is obtained;

step (4): according to the degree error variance of the gravity field recovery model, calculating a geoid-order error and an accumulative error of the geoid-order error, an gravity-anomaly order error and an accumulative error of the gravity-anomaly order error of the gravity field recovery model; and step (5): summarizing the valid order of the gravity field measurement, the geoid-order error and the accumulative error of the geoid-order error, and the gravity-anomaly order error and the accumulative error of the gravity-anomaly order error, so as to obtain the performance of satellite gravity field measurement by low-to-low satellite-to-satellite tracking.

The advantages of the present invention are as follows.

The present invention establishes parsing relationships between a measurement performance of the gravity field performance by low-to-low satellite-to-satellite tracking and the system parameters. The method of the present invention is capable of evaluating a measurement effect of the gravity field quickly and quantitatively, obtaining a rule of effects of the gravity satellite system parameters on the gravity field measurement performance, so as to avoid shortcoming caused by numerical simulation of the satellite gravity field measurement.

Table 1 shows an inter-satellite range change rate amplitude (m/s) under different orbit height and an inter-satellite geocentric vector included angle.

Table 2 shows physical parameters of gravity field measurement by low-to-low satellite-to-satellite tracking.

Table 3 shows parameters of the GRACE satellite system.

DETAILED DESCRIPTION OF THE PREFERRED EMBODIMENT

These and other objectives, features, and advantages of the present invention will become apparent from the following detailed description, the accompanying drawings, and the appended claims.

One skilled in the art will understand that the embodiment of the present invention as shown in the drawings and described above is exemplary only and not intended to be limiting.

As shown in FIGS. 1-5, a method for parsing and calculating performance of satellite gravity field measurement by low-to-low satellite-to-satellite tracking, comprises following steps of:

step (1): acquiring at least one parameter of a gravity satellite system by low-to-low satellite-to-satellite tracking;

step (2): according to the parameter of the gravity satellite system by low-to-low satellite-to-satellite tracking, calculating an effect of a measuring error of a gravity satellite load on a power spectrum of a nonspherical perturbation potential of earth gravity, so as to obtain an degree error variance of a potential coefficient in a gravity field recovery model;

step (3): comparing the degree error variance of the potential coefficient in the gravity field recovery model with an degree variance of a potential coefficient given by Kaula Rule, wherein with an increase of an order of the gravity field recovery model, the degree error variance gradually increases and the degree variance gradually decreases; when the degree error variance is equal to the degree variance, considering that a maximum valid order of the gravity field measurement is obtained;

step (4): according to the degree error variance of the gravity field recovery model, calculating a geoid-order error and an accumulative error of the geoid-order error, an gravity-anomaly order error and an accumulative error of the gravity-anomaly order error of the gravity field recovery model; and step (5): summarizing the valid order of the gravity field measurement, the geoid-order error and the accumulative error of the geoid-order error, and the gravity-anomaly order error and the accumulative error of the gravity-anomaly order error, so as to obtain the performance of satellite gravity field measurement by low-to-low satellite-to-satellite tracking.

In the step (1), the parameter of the gravity satellite system by low-to-low satellite-to-satellite tracking is selected from but not limited to the group consisting of at least one orbit parameter of the gravity satellite system and at least one load indicator of the gravity satellite system;

wherein the orbit parameter of the gravity satellite system is selected from the group consisting of a maximum valid order of the gravity field recovery $N_{max}$, a gravity-anomaly order error $\Delta_n$ of an nth order, a geoid-order accumulative error $\Delta$ of the nth order, a gravity-anomaly order error $\Delta g_n$ of the nth order and a gravity-anomaly accumulative error $\Delta g$ of the nth order;

the parameter of the gravity satellite system is selected from the group consisting of a gravity satellite orbit height h and an included angle $\theta_0$ of satellite-to-satellite geocentric vectors, the load indicator of the gravity satellite system is selected from the group consisting of an inter-satellite range change rate measurement error $(\Delta\dot{\rho})_m$, a satellite orbit determining position error $(\Delta r)_m$, a non-gravitational interference $\Delta F$, an inter-satellite range rate data sampling interval $(\Delta t)_{\Delta\dot{\rho}}$, satellite orbit position data sampling interval $(\Delta t)_{\Delta r}$ and a gravity field measurement service life T.

The step (2) specifically comprises steps of:

establishing an analytic formula of a low-to-low satellite-to-satellite tracking gravity field measurement degree error variance $\delta\sigma_n^2$ of a potential coefficient:

$$\delta\sigma_n^2 = \frac{1}{2n+1} \sum_{k=0}^{n} \left[ (\delta\overline{C}_{nk})^2 + (\delta\overline{S}_{nk})^2 \right] =$$

$$\frac{1}{\sum_{k=0}^{n} \left[ \begin{array}{c} B_1(r_0, n, k, \theta_0) + \\ B_2(r_0, n, k, \theta_0) + B_3(r_0, n, k, \theta_0) \end{array} \right]} \times \frac{1}{2n+1}$$

$$\frac{2(n+1)r_0^{2n}}{\pi\mu^2 T a_e^{2n-2}} \left[ \begin{array}{c} -D\sqrt{\left( \frac{(\Delta F)^2 T_{arc}^4}{36}(\Delta t)_{\Delta F} + (\Delta r)_m^2 (\Delta t)_{\Delta r} \right) f_{\delta r}(n)} + \\ \sqrt{\frac{\mu}{r_0}} \sqrt{\left( \frac{(\Delta F)^2 T_{arc}^2}{4}(\Delta t)_{\Delta F} + (\Delta\dot{\rho})_m^2 (\Delta t)_{\Delta\dot{\rho}} \right) f_{\delta\dot{\rho}}(n)} \end{array} \right]^2$$

wherein:

$$\begin{cases} B_1(r_0, n, k, \theta_0) = A_n^2(n-1, k, \theta_0) + \\ \left(\frac{a_e}{r_0}\right) |A_n(n-1, k, \theta_0) A_n(n, k, \theta_0)| + \\ \left(\frac{a_e}{r_0}\right)^2 |A_n(n-1, k, \theta_0) A_n(n+1, k, \theta_0)| \\ B_2(r_0, n, k, \theta_0) = \left(\frac{a_e}{r_0}\right)^2 A_n^2(n, k, \theta_0) + \\ \left(\frac{a_e}{r_0}\right) |A_n(n-1, k, \theta_0) A_n(n, k, \theta_0)| + \\ \left(\frac{a_e}{r_0}\right)^3 |A_n(n, k, \theta_0) A_n(n+1, k, \theta_0)| \\ B_3(r_0, n, k, \theta_0) = \left(\frac{a_e}{r_0}\right)^4 A_n^2(n+1, k, \theta_0) + \\ \left(\frac{a_e}{r_0}\right)^2 |A_n(n-1, k, \theta_0) A_n(n+1, k, \theta_0)| + \\ \left(\frac{a_e}{r_0}\right)^3 |A_n(n, k, \theta_0) A_n(n+1, k, \theta_0)| \end{cases}$$

$$A_n(l, k, \theta_0) = \delta_k \int_0^\pi [\overline{P}_{lk}(\cos(\theta+\theta_0)) - \overline{P}_{lk}(\cos\theta)] \overline{P}_{nk}(\cos\theta) \sin\theta d\theta$$

-continued $$\delta_k = \begin{cases} 2, & k = 0 \\ 1, & k \neq 0 \end{cases}$$

$$D = K \left( \frac{\cos \frac{\theta_0}{2}}{2} - \frac{4}{3} \right) \frac{\mu \sin \theta_0}{r_0^4}$$

$$f_{\delta r}(n) = \sum_{k=0}^{n} \int_0^{\pi} [\overline{P}_{nk}(\cos \theta)]^2 \cos^2(\theta + \xi) \sin^2 \theta d\theta = \frac{3}{8}(2n+1)\pi$$

$$f_{\delta \dot{\rho}}(n) = \left(n + \frac{1}{2}\right)\pi$$

$$r_0 = a_e + h$$

wherein $\delta\sigma_n^2$ is an degree error variance of a geopotential coefficient of the gravity field recovery model, $r_0$ is a geocentric range of a satellite, $\theta_0$ is a geocentric vector included angle, $a_e$ is an earth average radius, $\mu$ is a product of a gravitation constant and an earth mass, h is the gravity satellite orbit height, $T_{arc}$ is an integral arc length, $\Delta F$ is non-gravitational interference, $(\Delta t)_{\Delta F}$ is non-gravitational interference data interval, $(\Delta r)_m$ is a satellite orbit determination position error, $(\Delta t)_{\Delta r}$ is a satellite orbit data sampling interval, $(\Delta \dot{\rho})_m$ is an inter-satellite range change rate measurement error, $(\Delta t)_{\Delta \dot{\rho}}$ is an inter-satellite range change rate sampling interval, T is the gravity field measurement service life.

Value of a coefficient K and a phase $\xi$ is respectively:

$$K = 1.3476 \times 10^{11} m^2, \xi = -\frac{\pi}{2}.$$

The step (3) specifically comprises a step of establishing a maximum valid order $N_{max}$ of the gravity field measurement, which meets a formula of:

$$\delta\sigma_{N_{max}}^2 = \frac{1}{2N_{max}+1} \frac{1.6 \times 10^{-10}}{N_{max}^3}.$$

The step (4) specifically comprises:
establishing the geoid-order error corresponding to an nth order:

$$\Delta_n = a_e \sqrt{(2n+1)\delta\sigma_n^2},$$

and/or
establishing the geoid accumulative error corresponding to the nth order:

$$\Delta = \sqrt{\sum_{k=2}^{n} (\Delta_k)^2},$$

and/or
establishing the gravity-anomaly order error corresponding to the nth order:

$$\Delta g_n = \frac{\mu}{a_e^2}(n-1)\sqrt{(2n+1)\delta\sigma_n^2};$$

and/or
establishing the gravity-anomaly accumulative error corresponding to the nth order.

According to a preferred embodiment, if the gravity satellite system measures non-gravitational interference by low-to-low satellite-to-satellite tracking, $(\Delta t)_{\Delta F}$ is a non-gravitational interference measurement interval; if the gravity satellite system suppresses non-gravitational interference by low-to-low satellite-to-satellite tracking, $(\Delta t)_{\Delta F}$ is a non-gravitational interference suppression interval.

Further description of the present invention is illustrated combining with the preferred embodiment.

A low-to-low satellite-to-satellite tracking gravity field satellite system comprises two low-orbit satellites to form a following formation along a track. By measuring a range between the two satellites and a change rate thereof, a gravity field of the earth is recovered. In order to make a measurement accuracy of the data as consist as possible, and facilitate controlling satellite attitude and orbit, the orbit of the satellite is generally selected as a circular orbit or a near-circular orbit. And further, in order to meet the requirement of measuring all over the world, the satellite orbit is usually selected as a polar orbit or a near-polar orbit. Thus, in the method for parsing and calculating performance of satellite gravity field measurement by low-to-low satellite-to-satellite tracking, an eccentricity of the satellite orbit is supposed to be 0, and an orbit inclination is 90°.

Figure 1:
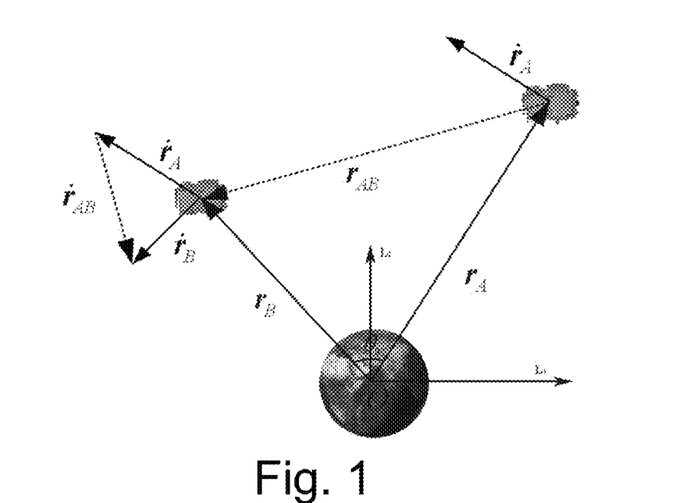
FIG. 1 is a sketch view of measuring a satellite formation of gravity field by low-to-low satellite-to-satellite tracking.

1. Energy Conservation Equation of the Gravity Field Measurement by Low-to-Low Tracking As showing in FIG. 1, two satellites which form the formation of the gravity field measurement by low-to-low satellite-to-satellite tracking are respectively denoted as A and B. B is a guiding satellite and A is a tracking satellite. An energy conservation exists between A and B as follows:

$$V_A - V_B = \frac{1}{2}(\dot{r}_A^2 - \dot{r}_B^2) - \omega[(r_x \dot{r}_y - r_y \dot{r}_x)_A - (r_x \dot{r}_y - r_y \dot{r}_x)_B] - \int_{t_0}^{t}(a_A \cdot \dot{r}_A - a_B \cdot \dot{r}_B) dt - V_{t,AB} - E_{0,AB} \quad (1)$$

In formula (1), a left of an equal sign is gravitational potential difference of the satellite A and the satellite B. A known gravitational potential spheric harmonics expansion is $$V(r, \theta, \lambda) = \frac{\mu}{r}\left[1 + \sum_{n=2}^{\infty} \sum_{k=0}^{n} \left(\frac{a_e}{r}\right)^n (\overline{C}_{nk} \cos k\lambda + \overline{S}_{nk} \sin k\lambda) \overline{P}_{nk}(\cos \theta)\right] \quad (2)$$

wherein (r, $\theta$, $\lambda$) is a spherical coordinate of a Earth-Centered Earth-Fixed coordinate system, $\mu$ is a gravitational constant, $a_e$ is an earth diameter, $\overline{C}_{nk}$ and $\overline{S}_{nk}$ are respectively a cosine value and a sine value of a nth-order k-gravitational coefficient, $\overline{P}_{nk}(\cos \theta)$ is a fully normalized Associated Legendre polynomials. Gravitational potential V(r, $\theta$, $\lambda$) is divided into two parts of a central gravitational potential $\mu/r$ and a nonspherical perturbation potential.

$$V(r, \theta, \lambda) = \frac{\mu}{r} + R(r, \theta, \lambda) \quad (3)$$

$$R(r, \theta, \lambda) = \frac{\mu}{r} \sum_{n=2}^{\infty} \sum_{k=0}^{n} \left(\frac{a_e}{r}\right)^n (\overline{C}_{nk} \cos k\lambda + \overline{S}_{nk} \sin k\lambda) \overline{P}_{nk}(\cos \theta) \quad (4)$$

Thus, a left hand of the formula (1) is expressed as:

$$V_A(r,\theta,\lambda) - V_B(r,\theta,\lambda) = \frac{\mu}{r_A} + R_A(r,\theta,\lambda) - \frac{\mu}{r_B} - R_B(r,\theta,\lambda) \quad (5)$$

$$= \left(\frac{\mu}{r_A} - \frac{\mu}{r_B}\right) + [R_A(r,\theta,\lambda) - R_B(r,\theta,\lambda)].$$

In the formula (1), a first item is a difference of kinetic energy of the satellite A and the satellite B. Setting e is a unit vector of the satellite A directing the satellite B, $$e = \frac{r_{AB}}{|r_{AB}|}. \quad (6)$$

A difference of kinetic energy of the satellite A and the satellite B is expressed as:

$$\frac{1}{2}(\dot{r}_A^2 - \dot{r}_B^2) = \quad (7)$$

$$-\frac{1}{2}(\dot{r}_A + \dot{r}_B) \cdot \dot{r}_{AB} = -\frac{1}{2}(\dot{r}_A + \dot{r}_B) \cdot \{(\dot{r}_{AB} \cdot e)e + [\dot{r}_{AB} - (\dot{r}_{AB} \cdot e)e]\}.$$

Considering a range between the satellite A and the satellite B is very small, an average velocity thereof is along a line segment of the satellite A and the satellite B, $$\frac{1}{2}(\dot{r}_A + \dot{r}_B) \cdot [(\dot{r}_{AB} \cdot e)e] \gg \frac{1}{2}(\dot{r}_A + \dot{r}_B) \cdot [\dot{r}_{AB} - (\dot{r}_{AB} \cdot e)e], \quad (8)$$

wherein the expression (8) has an approximate expression of:

$$\frac{1}{2}(\dot{r}_A^2 - \dot{r}_B^2) \approx -\frac{1}{2}(\dot{r}_A + \dot{r}_B) \cdot [(\dot{r}_{AB} \cdot e)e] = -\frac{1}{2}(\dot{r}_A + \dot{r}_B) \cdot (\dot{\rho}e), \quad (9)$$

wherein $\dot{\rho}$ is a range change rate between the satellite A and the satellite B, which is equal to a projection of $\dot{r}_{AB}$ on a unit vector e.

Since orbit of the satellite A and the satellite B are assumed to be circular orbit, and geocentric distances of the satellite A and the satellite B are basically equal, an average value is set to be $r_0$, the formula (9) is further expressed as:

$$\frac{1}{2}(\dot{r}_A^2 - \dot{r}_B^2) \approx -\sqrt{\frac{\mu}{r_0}} \dot{\rho}. \quad (10)$$

In the formula (1), a second item of a right hand of the formula is an energy difference of the satellite A and the satellite B caused by earth rotation, wherein calculation of value indicates that the second item thereof is 4 magnitudes less than a kinetic energy difference, and thus can be ignored in parsing and analyzing. A third item of a right hand of the formula (1) is an energy difference between the satellite A and the satellite B caused by non-gravitational disturbance. In the gravity field measurement, time accumulation of the non-gravitational disturbance causes a result that the satellite orbit shifts a pure gravity orbit, and meanwhile an inter-satellite distance range change rate shifts an inter-satellite range change rate under an effect of pure gravity. An offset of both a pure gravity orbit and a measurement error determine acquiring ability of change rate of the range between the pure-gravity satellite, in such a manner that an effect of the non-gravity disturbance can be introduced in analyzing a pure gravity orbit error and a pure gravity inter-satellite range change rate. A fourth item of the right hand of the item 4 is an energy difference of the satellite A and the satellite B caused by a third body gravitation and a tidal perturbation and etc. The third body gravitation and the tidal perturbation have high-precision model, and are capable of meeting measurement requirements of a static gravity field, and an effect of the third body gravitation and the tidal perturbation can be neglected. A fifth item on a right hand of the formula (1) is an integral constant which has no effect on measurement of the gravity field measurement.

When formula (5) and formula (6) are substituted into the formula (1), it can be obtained that $$R_A(r,\theta,\lambda) - R_B(r,\theta,\lambda) = -\sqrt{\frac{\mu}{r_0}} \dot{\rho} - \left(\frac{\mu}{r_A} - \frac{\mu}{r_B}\right) - E_{0,AB}. \quad (11)$$

Performing variation on the formula (11), it is obtained that $$\delta R_A - \delta R_B = \frac{1}{2}\sqrt{\frac{\mu}{r_0^3}} \dot{\rho}(\delta r) - \sqrt{\frac{\mu}{r_0}} \delta\dot{\rho} + \left(\frac{\mu}{r_A^2} - \frac{\mu}{r_B^2}\right)(\delta r) \quad (12)$$

$$\approx \frac{1}{2}\sqrt{\frac{\mu}{r_0^3}} \dot{\rho}(\delta r) - \sqrt{\frac{\mu}{r_0}} \delta\dot{\rho} + \frac{2\mu}{r_0^3}(r_B - r_A)(\delta r);$$

wherein $\delta r$ is a pure gravity orbit position error, comprising an orbit determination error and a pure gravity orbit offset caused by non-gravitational interference; $\delta\dot{\rho}$ is a pure-gravity orbit inter-satellite range change rate, comprising an inter-satellite range measurement error and an offset of an inter-satellite range change rate caused by non-gravitational interference. A relationship is established between the pure gravity orbit position error $\delta r$ and the pure-gravity orbit inter-satellite range change rate $\delta\dot{\rho}$ in the following disclosure.

2. Geometrical Relationship of the Difference of an Inter-Satellite Geocentric Range and an Inter-Satellite Range Change Rate.

As known that an inter-satellite range change rate of the satellite A and the satellite B is:

$$\dot{\rho} = \dot{r}_{AB} \cdot e = |\dot{r}_{AB}| \cos \langle \dot{r}_{AB}, e \rangle \quad (13)$$

Polar coordinates are adopted for calculating a geometrical relationship between the difference of the inter-satellite geocentric range $r_B - r_A$ and the inter-satellite range change rate $\dot{\rho}$. As shown in FIG. 1, in a plane determined by $r_A$ and $r_B$, $L_2$ is set to equally divide an included angle of $r_A$ and $r_B$ and a straight line $L_1$ is perpendicular to $L_2$. The core of the earth is selected as a pole, and the straight line is a polar axis, an anti-clockwise direction is an angle positive position, so a position vector of the satellite A and the satellite B is:

$$r_A = r_A e^{i\frac{\pi - \theta_0}{2}} \quad (14)$$

$$r_B = r_B e^{i\frac{\pi + \theta_0}{2}}; \quad (15)$$

wherein $\theta_0$ is a geocentric vector included angle of the satellite A and the satellite B.

A velocity vector of the satellite A and the satellite B is expressed as:

$$\dot{r}_A = \dot{r}_A e^{i\frac{2\pi-\theta_0}{2}}; \tag{16}$$

$$\dot{r}_B = \dot{r}_B e^{i\frac{2\pi+\theta_0}{2}}. \tag{17}$$

Thus, a position vector difference and a velocity vector difference of the satellite A and the satellite B is obtained:

$$r_{AB} = r_B - r_A = r_B e^{i\frac{\pi+\theta_0}{2}} - r_A e^{i\frac{\pi-\theta_0}{2}}; \tag{18}$$

$$\dot{r}_{AB} = \dot{r}_B - \dot{r}_A = \dot{r}_B e^{i\frac{2\pi+\theta_0}{2}} - \dot{r}_A e^{i\frac{2\pi-\theta_0}{2}}. \tag{19}$$

Under the non-spherical gravitational perturbation of the earth, a geocentric distance between the satellite A and the satellite B has periodic change. Setting a geocentric distance of the satellite A at a t moment is $r_0$, a geocentric distance of the satellite B is $r_0+\Delta r_0$, an argument of a vector e is calculated as follows. The formula (18) is substituted into the formula (6) to obtain:

$$e = \frac{r_{AB}}{|r_{AB}|} = \frac{(r_0+\Delta r_0)e^{i\frac{\pi+\theta_0}{2}} - r_0 e^{i\frac{\pi+\theta_0}{2}}}{\rho}, \tag{20}$$

Wherein $\rho$ is an inter-satellite distance of the satellite A and the satellite B. Rearranging the formula (20) to obtain;

$$e = \frac{-(2r_0+\Delta r_0)\sin\frac{\theta_0}{2} + i\Delta r_0 \cos\frac{\theta_0}{2}}{\rho}, \tag{21}$$

In such a manner that an argument of e is obtained:

$$\arg(e) = \pi + \arctan\left(-\frac{\Delta r_0}{(2r_0+\Delta r_0)\tan\frac{\theta_0}{2}}\right). \tag{22}$$

An argument of $\dot{r}_{AB}$ is obtained, under a consumption of a circular orbit, a velocity value of the satellite A and the satellite B is approximately:

$$\dot{r}_A = \sqrt{\frac{\mu}{r_0}} \tag{23}$$

$$\dot{r}_B = \sqrt{\frac{\mu}{r_0+\Delta r_0}}. \tag{24}$$

The formula (23) and the formula (24) are substituted into the formula (19) to obtain:

$$\dot{r}_{AB} = \dot{r}_B - \dot{r}_A = \sqrt{\frac{\mu}{r_0+\Delta r_0}} e^{i\frac{2\pi+\theta_0}{2}} - \sqrt{\frac{\mu}{r_0}} e^{i\frac{2\pi-\theta_0}{2}}. \tag{25}$$

Rearrange the formula (25) and obtains:

$$\dot{r}_{AB} = \left(\sqrt{\frac{\mu}{r_0}} - \sqrt{\frac{\mu}{r_0+\Delta r_0}}\right)\cos\frac{\theta_0}{2} - i\left(\sqrt{\frac{\mu}{r_0+\Delta r_0}} + \sqrt{\frac{\mu}{r_0}}\right)\sin\frac{\theta_0}{2} \tag{26}$$

Thus, a ratio of an inscriber to a real part of $\dot{r}_{AB}$ is:

$$\frac{\mathrm{Im}(\dot{r}_{AB})}{\mathrm{Re}(\dot{r}_{AB})} = -\frac{\left(\sqrt{\frac{\mu}{r_0+\Delta r_0}} + \sqrt{\frac{\mu}{r_0}}\right)\sin\frac{\theta_0}{2}}{\left(\sqrt{\frac{\mu}{r_0}} - \sqrt{\frac{\mu}{r_0+\Delta r_0}}\right)\cos\frac{\theta_0}{2}} \approx -\frac{(4r_0+\Delta r_0)\tan\frac{\theta_0}{2}}{\Delta r_0}, \tag{27}$$

Thus, an argument of $\dot{r}_{AB}$ is:

$$\arg(\dot{r}_{AB}) = \arctan\left(\frac{\Delta r_0}{(4r_0+\Delta r_0)\tan\frac{\theta_0}{2}}\right) - \frac{\pi}{2} \tag{28}$$

From the formula (22) and (28), an included angle between e and $\dot{r}_{AB}$ is:

$$\langle \dot{r}_{AB}, e\rangle = \arg(\dot{r}_{AB}) - \arg(e) \tag{29}$$
$$= \arctan\left(\frac{\Delta r_0}{(4r_0+\Delta r_0)\tan\frac{\theta_0}{2}}\right) +$$
$$\arctan\left(\frac{\Delta r_0}{(2r_0+\Delta r_0)\tan\frac{\theta_0}{2}}\right) - \frac{3\pi}{2};$$

so $\cos\langle \dot{r}_{AB}, e\rangle =$ \hfill (30)

$$\cos\left[\arctan\left(\frac{\Delta r_0}{(4r_0+\Delta r_0)\tan\frac{\theta_0}{2}}\right) + \arctan\left(\frac{\Delta r_0}{(2r_0+\Delta r_0)\tan\frac{\theta_0}{2}}\right) - \frac{3\pi}{2}\right].$$

Simplifying the formula (30) to obtain:

$$\cos\langle \dot{r}_{AB}, e\rangle \approx \frac{3\Delta r_0}{4r_0 \tan\frac{\theta_0}{2}}. \tag{31}$$

From the formula (13) and the formula (31), it is obtained that:

$$|\dot{r}_{AB}| = \frac{\dot{\rho}}{\cos\langle \dot{r}_{AB}, e\rangle} = \frac{4r_0\left(\tan\frac{\theta_0}{2}\right)\dot{\rho}}{3\Delta r_0}. \tag{32}$$

From the formula (26), it is obtained that:

$$|\dot{r}_{AB}|^2 = \tag{33}$$
$$\left(\sqrt{\frac{\mu}{r_0}} - \sqrt{\frac{\mu}{r_0+\Delta r_0}}\right)^2\cos^2\frac{\theta_0}{2} + \left(\sqrt{\frac{\mu}{r_0+\Delta r_0}} + \sqrt{\frac{\mu}{r_0}}\right)^2\sin^2\frac{\theta_0}{2}.$$

From the formula (32) and the formula (33), a relationship between an inter-satellite geocentric range difference $\Delta_0$ and an inter-satellite distance change rate $\dot{\rho}$ is:

$$r_B - r_A = \Delta r_0 = -\frac{2r_0}{3\cos\frac{\theta_0}{2}}\sqrt{\frac{r_0}{\mu}}\dot{\rho}. \tag{34}$$

When the formula (34) is substituted into the formula (12), an energy conservation of the gravity field measurement by low-to-low satellite-to-satellite is:

$$\delta R_A - \delta R_B = \left(\frac{1}{2} - \frac{4}{3\cos\frac{\theta_0}{2}}\right)\sqrt{\frac{\mu}{r_0^3}}\dot{\rho}\delta r - \sqrt{\frac{\mu}{r_0}}\delta\dot{\rho}. \quad (35)$$

In order to calculate a power spectral density of items in a right hand of the formula (35), a change rule of $\dot{\rho}$ with time is needed.

3. Mathematical Expression of the Inter-Satellite Distance Change Rate

A semi-major of the satellite orbit changes periodically due to perturbation affection of the earth gravity, which causes a result that the inter-satellite change rate changes periodically accordingly, wherein J2 perturbation is a main perturbation item, and an effect thereof is classified as a long term item and a short term item. The long term item of the J2 perturbation has no effect on semi-major of the orbit, and an effect of the short term item on the semi-major is:

$$a_s(t) = \frac{3}{2}\frac{J_2}{a}\left\{\frac{2}{3}\left(1-\frac{3}{2}\sin^2 i\right)\left[\left(\frac{a}{r}\right)^3 - (1-e^2)^{-3/2}\right] + \sin^2 i\left(\frac{a}{r}\right)^3 \cos 2(f+\omega)\right\}; \quad (36)$$

wherein a is a semi-major, i is an orbit inclination, r is an geocentric distance, e is an orbit eccentricity, f is a true anomaly, ω is a perigee argument. Regarding to a low-to-low satellite-to-satellite tracking gravity field satellite, $$\begin{cases} i \approx 90° \\ e \approx 0 \\ a \approx r \end{cases} \quad (37)$$

so the formula (36) is approximately expressed as:

$$r_s(t) = \frac{3}{2}\frac{J_2}{r}\cos(2\theta + \xi); \quad (38)$$

wherein θ is colatitude, ξ is an initial phase angle, so a difference of an instantaneous geocentric distance between two satellites of low-to-low satellite-to-satellite tracking is:

$$\Delta r_0 = \frac{3}{2}\frac{J_2}{r}[\cos(2\theta + 2\theta_0 + \xi) - \cos(2\theta + \xi)] \quad (39)$$

So it is known that an amplitude of change of the difference of the geocentric distance of the two satellites is in direct proportion to $$\frac{\sin\theta_0}{r_0},$$

wherein $\theta_0$ is geocentric vector included angle of the two satellites. Considering the formula (34), it is known that:

$$Am(\dot{\rho}) \propto \frac{\cos\frac{\theta_0}{2}}{r_0^2}\sqrt{\frac{\mu}{r_0}}\sin\theta_0, \quad (40)$$

wherein Am(•) represents an amplitude, a change period of the inter-satellite distance change rate is identical to an orbit period, so:

$$\dot{\rho}(t) = K\frac{\cos\frac{\theta_0}{2}}{r_0^2}\sqrt{\frac{\mu}{r_0}}\sin\theta_0\cos(nt+\xi), \quad (41)$$

wherein K is an undetermined coefficient, n is an angular velocity of the orbit, $\xi=-\pi/2$ is an initial phase. Since an orbit of the satellite is a polar orbit, so:

$$\dot{\rho}(\theta) = K\frac{\cos\frac{\theta_0}{2}}{r_0^2}\sqrt{\frac{\mu}{r_0}}\sin\theta_0\cos(\theta+\xi). \quad (42)$$

In order to obtain a coefficient K, integral of pure gravity orbit is calculated under different orbit height and inter-satellite distance. An amplitude of vibration of the inter-satellite distance change rate is obtained according to a integral orbit, as shown in Table. 1.

TABLE 1

Figure 2:
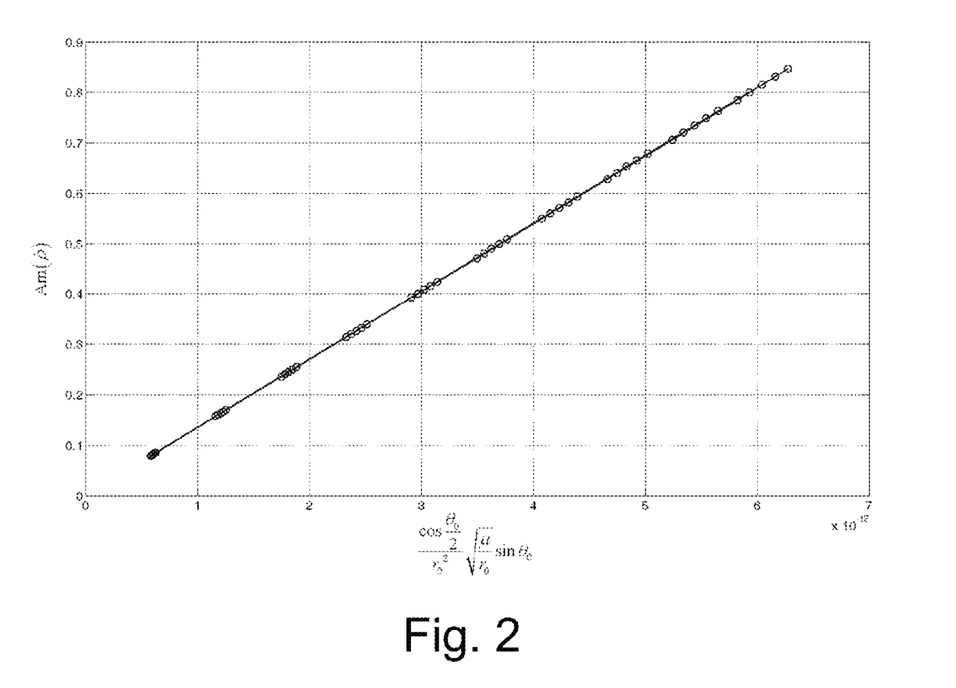
FIG. 2 is a sketch view showing relationships among an inter-satellite amplitude and $r_0$ and $\theta_0$.

| | 0.2° | 0.4° | 0.6° | 0.8° | 1.0° |
|---|---|---|---|---|---|
| 200 km | 8.52384717 × 10⁻² | 1.70054302 × 10⁻¹ | 2.54878559 × 10⁻¹ | 3.39375389 × 10⁻¹ | 4.24052520 × 10⁻¹ |
| 250 km | 8.39648169 × 10⁻² | 1.66955167 × 10⁻¹ | 2.49980172 × 10⁻¹ | 3.32888860 × 10⁻¹ | 4.15999957 × 10⁻¹ |
| 300 km | 8.22614068 × 10⁻² | 1.63879328 × 10⁻¹ | 2.45575028 × 10⁻¹ | 3.26890250 × 10⁻¹ | 4.08533929 × 10⁻¹ |
| 350 km | 8.07749317 × 10⁻² | 1.60715522 × 10⁻¹ | 2.40566235 × 10⁻¹ | 3.20445000 × 10⁻¹ | 4.00451832 × 10⁻¹ |
| 400 km | 7.90730919 × 10⁻² | 1.57561129 × 10⁻¹ | 2.35965947 × 10⁻¹ | 3.14446876 × 10⁻¹ | 3.92894479 × 10⁻¹ |
| | 1.2° | 1.4° | 1.6° | 1.8° | 2.0° |
| 200 km | 5.08769221 × 10⁻¹ | 5.93621975 × 10⁻¹ | 6.78081254 × 10⁻¹ | 7.62879389 × 10⁻¹ | 8.47098944 × 10⁻¹ |
| 250 km | 4.99688820 × 10⁻¹ | 5.82412568 × 10⁻¹ | 6.65497074 × 10⁻¹ | 7.48424917 × 10⁻¹ | 8.31446183 × 10⁻¹ |
| 300 km | 4.90153499 × 10⁻¹ | 5.71442505 × 10⁻¹ | 6.53303618 × 10⁻¹ | 7.34316987 × 10⁻¹ | 8.15750088 × 10⁻¹ |
| 350 km | 4.80516090 × 10⁻¹ | 5.60716101 × 10⁻¹ | 6.40541874 × 10⁻¹ | 7.20322030 × 10⁻¹ | 8.00195000 × 10⁻¹ |
| 400 km | 4.71103131 × 10⁻¹ | 5.49539036 × 10⁻¹ | 6.28048672 × 10⁻¹ | 7.06380954 × 10⁻¹ | 7.84346464 × 10⁻¹ |

$$\frac{\cos\frac{\theta_0}{2}}{r_0^2}\sqrt{\frac{\mu}{r_0}}\sin\theta_0$$

is a horizontal ordinate, an amplitude of the inter-satellite distance change rate in the Table 1 is an ordinate, so as to obtain a straight line shown in FIG. 2, which improves that the inter-satellite change rate formula in the expression (42) is rational. Fitting to obtain the coefficient K;

$$K=1.3476\times10^{11}\ m^2 \tag{43}$$

The formula (42) is substituted into the formula (35), so as to obtain an energy change equation by low-to-low satellite-to-satellite tracking:

$$\delta R_A - \delta R_B = K\left(\frac{\cos\frac{\theta_0}{2}}{2} - \frac{4}{3}\right)\frac{\mu\sin\theta_0}{r_0^4}\cos(\theta+\xi)\delta r - \sqrt{\frac{\mu}{r_0}}\delta\dot{\rho}. \tag{44}$$

Based on the formula (44), an degree error variance of the gravity field measurement by low-to-low satellite-to-satellite tracking is established, in such a manner that a valid order of the gravity field measurement, a geoid error and the gravity anomaly error is obtained.

4. Degree Error Variance of the Gravity Field Measurement by Low-to-Low Satellite-to-Satellite Tracking From the formula (44), an degree error variance of an nth order is:

$$P_n^2(\delta R_A - \delta R_B) = P_n^2\left[K\left(\frac{\cos\frac{\theta_0}{2}}{2} - \frac{4}{3}\right)\frac{\mu\sin\theta_0}{r_0^4}\cos(\theta+\xi)\delta r - \sqrt{\frac{\mu}{r_0}}\delta\dot{\rho}\right]. \tag{45}$$

Regarding to the formula (45), it is obtained from a power spectrum definition that:

$$P_n^2(\delta R_A - \delta R_B) = \sum_{k=-n}^{n}\left[\frac{1}{4\pi}\int_0^{2\pi}\int_0^{\pi}(\delta R_A - \delta R_B)\overline{Y}_{nk}(\theta,\lambda)\sin\theta d\theta d\lambda\right]^2, \tag{46}$$

wherein:

$$\overline{Y}_{nk}(\theta,\lambda) = \overline{P}_{n|k|}(\cos\theta)Q_k(\lambda) \tag{47}$$

$$Q_k(\lambda) = \begin{cases} \cos k\lambda & k \geq 0 \\ \sin|k|\lambda & k < 0 \end{cases}. \tag{48}$$

Since the two satellites of low-to-low satellite-to-satellite tracking are both operated along a polar orbit and are provide in an identical orbit plane, so a nonspherical perturbation potential of the two satellites are respectively expressed:

$$R_A(r,\theta,\lambda) = \frac{\mu}{r_0}\sum_{n=2}^{\infty}\sum_{k=0}^{n}\left(\frac{a_e}{r_0}\right)^n(\overline{C}_{nk}\cos k\lambda + \overline{S}_{nk}\sin k\lambda)\overline{P}_{nk}(\cos(\theta+\theta_0)) \tag{49}$$

-continued $$R_B(r,\theta,\lambda) = \frac{\mu}{r_0}\sum_{n=2}^{\infty}\sum_{k=0}^{n}\left(\frac{a_e}{r_0}\right)^n(\overline{C}_{nk}\cos k\lambda + \overline{S}_{nk}\sin k\lambda)\overline{P}_{nk}(\cos\theta). \tag{50}$$

The formula (49) and the formula (50) are substituted into the formula (46) to obtain:

$$P_n^2(\delta R_A - \delta R_B) = \tag{51}$$

$$\sum_{k=-n}^{n}\left[\frac{1}{4\pi}\int_0^{2\pi}\int_0^{\pi}\left(\frac{\mu}{r_0}\sum_{l=2}^{\infty}\sum_{m=0}^{l}\left(\frac{a_e}{r_0}\right)^l(\delta\overline{C}_{lm}\cos m\lambda + \delta\overline{S}_{lm}\sin m\lambda)\right)\left[\overline{P}_{lm}(\cos(\theta+\theta_0)) - \overline{P}_{lm}(\cos\theta)\right]\overline{Y}_{nk}(\theta,\lambda)\sin\theta d\theta d\lambda\right]^2$$

$$\approx \frac{1}{16}\frac{\mu^2}{r_0^2}$$

$$\sum_{k=0}^{n}\left[\sum_{l=n-1,n,n+1}\delta(k)(\delta\overline{C}_{lk})\left(\frac{a_e}{r_0}\right)^l\int_0^{\pi}\left[\overline{P}_{lk}(\cos(\theta+\theta_0)) - \overline{P}_{lk}(\cos\theta)\right]\overline{P}_{nk}(\cos\theta)\sin\theta d\theta\right]^2 +$$

$$\frac{1}{16}\frac{\mu^2}{r_0^2}\sum_{k=1}^{n}\left[\sum_{l=n-1,n,n+1}^{\infty}(\delta\overline{S}_{lk})\left(\frac{a_e}{r_0}\right)^l\int_0^{\pi}\left[\overline{P}_{lk}(\cos(\theta+\theta_0)) - \overline{P}_{lk}(\cos\theta)\right]\overline{P}_{nk}(\cos\theta)\sin\theta d\theta\right]^2,$$

wherein:

$$\delta_k = \begin{cases} 2, & k = 0 \\ 1, & k \neq 0 \end{cases}; \tag{52}$$

setting:

$$A_n(l,k,\theta_0) = \delta_k\int_0^{\pi}[\overline{P}_{lk}(\cos(\theta+\theta_0)) - \overline{P}_{lk}(\cos\theta)]\overline{P}_{nk}(\cos\theta)\sin\theta d\theta, \tag{53}$$

Then the formula (51) becomes:

$$P_n^2(\delta R_A - \delta R_B) = \frac{1}{16}\frac{\mu^2}{r_0^2}\left(\frac{a_e}{r_0}\right)^{2(n-1)} \tag{54}$$

$$\sum_{k=0}^{n}\left[\begin{array}{c}(\delta\overline{C}_{n-1,k})A_n(n-1,k,\theta_0) + (\delta\overline{C}_{nk})\left(\frac{a_e}{r_0}\right)A_n(n,k,\theta_0) + \\ (\delta\overline{C}_{n+1,k})\left(\frac{a_e}{r_0}\right)^2 A_n(n+1,k,\theta_0)\end{array}\right]^2 +$$

$$\frac{1}{16}\frac{\mu^2}{r_0^2}\left(\frac{a_e}{r_0}\right)^{2(n-1)}$$

$$\sum_{k=1}^{n}\left[\begin{array}{c}(\delta\overline{S}_{n-1,k})A_n(n-1,k,\theta_0) + (\delta\overline{S}_{nk})\left(\frac{a_e}{r_0}\right)A_n(n,k,\theta_0) + \\ (\delta\overline{S}_{n+1,k})\left(\frac{a_e}{r_0}\right)^2 A_n(n+1,k,\theta_0)\end{array}\right]^2.$$

An expression in a first bracket is calculated, and a quadratic term is launched and an inequality expression is utilized to obtain:

$$\sum_{k=0}^{n} \left[ \begin{array}{c} (\delta\overline{C}_{n-1,k})A_n(n-1,k,\theta_0) + (\delta\overline{C}_{nk})\left(\frac{a_e}{r_0}\right)A_n(n,k,\theta_0) + \\ (\delta\overline{C}_{n+1,k})\left(\frac{a_e}{r_0}\right)^2 A_n(n+1,k,\theta_0) \end{array} \right]^2 \leq \quad (55)$$

$$\sum_{k=0}^{n} \left[ (\delta\overline{C}_{n-1,k})^2 \left[ A_n^2(n-1,k,\theta_0) + \left(\frac{a_e}{r_0}\right)|A_n(n-1,k,\theta_0)A_n(n,k,\theta_0)| + \right.\right.$$

$$\left.\left(\frac{a_e}{r_0}\right)^2 |A_n(n-1,k,\theta_0)A_n(n+1,k,\theta_0)|\right] +$$

$$(\delta\overline{C}_{nk})^2 \left[\left(\frac{a_e}{r_0}\right)^2 A_n^2(n,k,\theta_0) + \left(\frac{a_e}{r_0}\right)|A_n(n-1,k,\theta_0)A_n(n,k,\theta_0)| + \right.$$

$$\left.\left(\frac{a_e}{r_0}\right)^3 |A_n(n,k,\theta_0)A_n(n+1,k,\theta_0)|\right] (\delta\overline{C}_{n+1,k})^2 \left[\left(\frac{a_e}{r_0}\right)^4 A_n^2(n+1,k,\theta_0) + \right.$$

$$\left.\left.\left(\frac{a_e}{r_0}\right)^2 |A_n(n-1,k,\theta_0)A_n(n+1,k,\theta_0)| + \left(\frac{a_e}{r_0}\right)^3 |A_n(n,k,\theta_0)A_n(n+1,k,\theta_0)|\right]\right]$$

if $$\begin{cases} B_1(r_0,n,k,\theta_0) = A_n^2(n-1,k,\theta_0) + \left(\frac{a_e}{r_0}\right)|A_n(n-1,k,\theta_0)A_n(n,k,\theta_0)| + \\ \qquad \left(\frac{a_e}{r_0}\right)^2 |A_n(n-1,k,\theta_0)A_n(n,k,\theta_0)| \\ B_2(r_0,n,k,\theta_0) = \left(\frac{a_e}{r_0}\right)^2 A_n^2(n,k,\theta_0) + \\ \left(\frac{a_e}{r_0}\right)|A_n(n-1,k,\theta_0)A_n(n,k,\theta_0)| + \left(\frac{a_e}{r_0}\right)^3 |A_n(n,k,\theta_0)A_n(n+1,k,\theta_0)| \\ B_3(r_0,n,k,\theta_0) = \left(\frac{a_e}{r_0}\right)^4 A_n^2(n+1,k,\theta_0) + \\ \left(\frac{a_e}{r_0}\right)^2 |A_n(n-1,k,\theta_0)A_n(n+1,k,\theta_0)| + \left(\frac{a_e}{r_0}\right)^3 |A_n(n,k,\theta_0)A_n(n+1,k,\theta_0)| \end{cases} \quad (56)$$

wherein the expression (55) is expressed as:

$$\sum_{k=0}^{n} \left[ \begin{array}{c} (\delta\overline{C}_{n-1,k})A_n(n-1,k,\theta_0) + (\delta\overline{C}_{nk})\left(\frac{a_e}{r_0}\right)A_n(n,k,\theta_0) + \\ (\delta\overline{C}_{n+1,k})\left(\frac{a_e}{r_0}\right)^2 A_n(n+1,k,\theta_0) \end{array} \right]^2 \leq \quad (57)$$

$$\sum_{k=0}^{n} \left[ (\delta\overline{C}_{n-1,k})^2 B_1(r_0,n,k,\theta_0) + (\delta\overline{C}_{nk})^2 B_2(r_0,n,k,\theta_0) + \right.$$

$$\left. (\delta\overline{C}_{n+1,k})^2 B_3(r_0,n,k,\theta_0) \right] \approx \sum_{k=0}^{n} (\delta\overline{C}_{nk})^2 \cdot \frac{1}{n+1}$$

$$\sum_{k=0}^{n} [B_1(r_0,n,k,\theta_0) + B_2(r_0,n,k,\theta_0) + B_3(r_0,n,k,\theta_0)].$$

Similarly, an expression in a second bracket in the formula (54) is:

$$\sum_{k=1}^{n} \left[ \begin{array}{c} (\delta\overline{S}_{n-1,k})A_n(n-1,k,\theta_0) + (\delta\overline{S}_{nk})\left(\frac{a_e}{r_0}\right)A_n(n,k,\theta_0) + \\ (\delta\overline{S}_{n+1,k})\left(\frac{a_e}{r_0}\right)^2 A_n(n+1,k,\theta_0) \end{array} \right]^2 \approx \quad (58)$$

$$\sum_{k=0}^{n} (\delta\overline{S}_{nk})^2 \cdot \frac{1}{n+1}$$

$$\sum_{k=0}^{n} [B_1(r_0,n,k,\theta_0) + B_2(r_0,n,k,\theta_0) + B_3(r_0,n,k,\theta_0)].$$

The formula (57) and the formula (58) is substituted into the formula (54):

$$P_n^2(\delta R_A - \delta R_B) = \frac{1}{16(n+1)} \frac{\mu^2}{r_0^2} \left(\frac{a_e}{r_0}\right)^{2(n-1)} \quad (59)$$

$$\sum_{k=0}^{n} [B_1(r_0,n,k,\theta_0) + B_2(r_0,n,k,\theta_0) + B_3(r_0,n,k,\theta_0)] \cdot$$

$$\sum_{k=0}^{n} \left[(\delta\overline{C}_{nk})^2 + (\delta\overline{S}_{nk})^2\right].$$

A right hand part of the formula (45) is calculated:

$$D = K\left(\frac{\cos\frac{\theta_0}{2}}{2} - \frac{4}{3}\right)\frac{\mu\sin\theta_0}{r_0^4}, \quad (60)$$

according to a definition of power spectral density, a right hand part of the formula (45) is:

$$P_n^2\left[D\cos(\theta+\xi)\delta r - \sqrt{\frac{\mu}{r_0}}\,\delta\dot{\rho}\right] = \quad (61)$$

$$\sum_{k=-n}^{n} \left\{\frac{D}{4\pi} \int_0^{2\pi} \int_0^{\pi} \cos(\theta+\xi)\delta r \overline{Y}_{nk}(\theta,\lambda)\sin\theta d\theta d\lambda\right\}^2 +$$

-continued $$\sum_{k=-n}^{n}\left\{\frac{1}{4\pi}\sqrt{\frac{\mu}{r_0}}\int_0^{2\pi}\int_0^{\pi}\delta\dot{\rho}\overline{Y}_{nk}(\theta,\lambda)\sin\theta d\theta d\lambda\right\}^2 -$$

$$\sum_{k=-n}^{n}\left\{2\cdot\frac{D}{4\pi}\int_0^{2\pi}\int_0^{\pi}\cos(\theta+\xi)\delta r\overline{Y}_{nk}(\theta,\lambda)\sin\theta d\theta\right.$$

$$\left. d\lambda\cdot\frac{1}{4\pi}\sqrt{\frac{\mu}{r_0}}\int_0^{2\pi}\int_0^{\pi}\delta\dot{\rho}\overline{Y}_{nk}(\theta,\lambda)\sin\theta d\theta d\lambda\right\}$$

wherein each item in the formula (61) is respectively:

$$\sum_{k=-n}^{n}\left\{\frac{D}{4\pi}\int_0^{2\pi}\int_0^{\pi}\cos(\theta+\xi)\delta r\overline{Y}_{nk}(\theta,\lambda)\sin\theta d\theta d\lambda\right\}^2 = \tag{62}$$

$$\left(\frac{D}{4\pi}\right)^2\frac{2\pi S_{\delta r}}{T}\sum_{k=0}^{n}\int_0^{\pi}[\overline{P}_{nk}(\cos\theta)]^2\cos^2(\theta+\xi)\sin^2\theta d\theta$$

$$\sum_{k=-n}^{n}\left\{\frac{1}{4\pi}\sqrt{\frac{\mu}{r_0}}\int_0^{2\pi}\int_0^{\pi}\delta\dot{\rho}\overline{Y}_{nk}(\theta,\lambda)\sin\theta d\theta d\lambda\right\}^2 = \tag{63}$$

$$\left(\frac{1}{4\pi}\sqrt{\frac{\mu}{r_0}}\right)^2\frac{2\pi S_{\delta\dot{\rho}}}{T}\sum_{k=0}^{n}\int_0^{\pi}[\overline{P}_{nk}(\cos\theta)]^2\sin^2\theta d\theta;$$

wherein $S_{\delta r}$ is a power spectral density of a $\delta r$ of a pure gravity orbit position, $S_{\delta\dot{\rho}}$ is a power spectral density of orbit inter-satellite distance change rate error $\delta\dot{\rho}$ under a pure gravity, T is a total measurement time of the gravity field, in order to express in a convenient way, in the formula (62) and the formula (63), setting:

$$f_{\delta r}(n) = \sum_{k=0}^{n}\int_0^{\pi}[\overline{P}_{nk}(\cos\theta)]^2\cos^2(\theta+\xi)\sin^2\theta d\theta \tag{64}$$

$$f_{\delta\dot{\rho}}(n) = \sum_{k=0}^{n}\int_0^{\pi}[\overline{P}_{nk}(\cos\theta)]^2\sin^2\theta d\theta. \tag{65}$$

By (61)-(65) to obtain:

$$P_n^2\left[D\cos(\theta+\xi)\delta r - \sqrt{\frac{\mu}{r_0}}\delta\dot{\rho}\right] \leq \tag{66}$$

$$\left[\frac{-D}{4\pi}\sqrt{\frac{2\pi S_{\delta r}}{T}f_{\delta r}(n)} + \frac{1}{4\pi}\sqrt{\frac{\mu}{r_0}}\sqrt{\frac{2\pi S_{\delta\dot{\rho}}}{T}f_{\delta\dot{\rho}}(n)}\right]^2.$$

It is known that the relationship between a variance of a pure gravity satellite position error $\beta r$ and the pure gravity satellite distance change rate error $\beta\rho$ and the power spectral density is:

$$\sigma_{\delta r}^2 = \int_{-f_{\delta r,max}}^{f_{\delta r,max}}S_{\delta r}(f)df = 2S_{\delta r}f_{\delta r,max} \tag{67}$$

$$\sigma_{\delta\dot{\rho}}^2 = \int_{-f_{\delta\dot{\rho},max}}^{f_{\delta\dot{\rho},max}}S_{\delta\dot{\rho}}(f)df = 2S_{\delta\dot{\rho}}f_{\delta\dot{\rho},max}, \tag{68}$$

wherein the maximum frequency $f_{\delta r,max}$ and $f_{\delta\dot{\rho},max}$ usually takes a Nyquist frequency, $$f_{\delta r,max} = \frac{1}{2(\Delta t)_{\delta r}} \tag{69}$$

$$f_{\delta\dot{\rho},max} = \frac{1}{2(\Delta t)_{\delta\dot{\rho}}}, \tag{70}$$

wherein $(\Delta t)_{\delta r}$ and $(\Delta t)_{\delta\dot{\rho}}$ are respectively data sampling intervals of the pure gravity position error and the pure inter-satellite distance change rate. The formulas (67)-(70) are substituted into the formula (66) to obtain:

$$P_n^2\left[D\cos(\theta+\xi)\delta r - \sqrt{\frac{\mu}{r_0}}\delta\dot{\rho}\right] \leq \tag{71}$$

$$\left[\frac{-D}{4\pi}\sqrt{\frac{2\pi\sigma_{\delta r}^2(\Delta t)_{\delta r}}{T}f_{\delta r}(n)} + \frac{1}{4\pi}\sqrt{\frac{\mu}{r_0}}\sqrt{\frac{2\pi\sigma_{\delta\dot{\rho}}^2(\Delta t)_{\delta\dot{\rho}}}{T}f_{\delta\dot{\rho}}(n)}\right]^2 =$$

$$\frac{1}{8\pi T}\left[-D\sqrt{\sigma_{\delta r}^2(\Delta t)_{\delta r}f_{\delta r}(n)} + \sqrt{\frac{\mu}{r_0}}\sqrt{\sigma_{\delta\dot{\rho}}^2(\Delta t)_{\delta\dot{\rho}}f_{\delta\dot{\rho}}(n)}\right]^2.$$

From the formula (45), (59) and (71), an degree error variance of the gravity field measurement by low-to-low satellite-to-satellite tracking is obtained:

$$\delta\sigma_n^2 = \frac{1}{2n+1}\sum_{k=0}^{n}\left[(\delta\overline{C}_{nk})^2 + (\delta\overline{S}_{nk})^2\right] = \tag{72}$$

$$\frac{1}{\sum_{k=0}^{n}[B_1(r_0,n,k,\theta_0) + B_2(r_0,n,k,\theta_0) + B_3(r_0,n,k,\theta_0)]} \times$$

$$\frac{2(n+1)}{2n+1}$$

$$\frac{r_0^{2n}}{\pi\mu^2 Ta_e^{2n-2}}\left[-D\sqrt{\sigma_{\delta r}^2(\Delta t)_{\delta r}f_{\delta r}(n)} + \sqrt{\frac{\mu}{r_0}}\sqrt{\sigma_{\delta\dot{\rho}}^2(\Delta t)_{\delta\dot{\rho}}f_{\delta\dot{\rho}}(n)}\right]^2.$$

In the formula (72), the pure gravity position error $\sigma_{\delta r}^2$ comprises a pure gravity orbit determination error $(\Delta r)_m^2$ and a pure gravity orbit offset $(\Delta r)_{\Delta F}^2$ caused by non-gravitational interference. Similarly, an inter-satellite distance change rate error $\sigma_{\delta\dot{\rho}}^2$ under the pure gravity effect comprises: an inter-satellite distance change rate measurement error $(\Delta\dot{\rho}\&)_m^2$ and an inter-satellite distance change rate measurement error $(\Delta\dot{\rho})_m^2$ and an inter-satellite distance change rate offset $(\Delta\dot{\rho})_{\Delta F}^2$ caused by non-gravitational interference:

$$\sigma_{\delta r}^2(\Delta t)_{\delta r} = (\Delta r)_{\Delta F}^2(\Delta t)_{\Delta F} + (\Delta r)_m^2(\Delta t)_{\Delta r} \tag{73}$$

$$\sigma_{\delta\dot{\rho}}^2(\Delta t)_{\delta\dot{\rho}} = (\Delta\dot{\rho})_{\Delta F}^2(\Delta t)_{\Delta F} + (\Delta\dot{\rho})_m^2(\Delta t)_{\Delta\dot{\rho}} \tag{74},$$

wherein $(\Delta t)_{\Delta F}$ is non-gravitational interference data interface, $(\Delta t)_{\Delta r}$ is a sampling interval of the satellite orbit data, $(\Delta t)_{\Delta\dot{\rho}}$ is a sampling interval of an inter-satellite distance change rate data. It is worth mentioning that:

if the gravity satellite system measures non-gravitational interference by low-to-low satellite-to-satellite tracking, $(\Delta t)_{\Delta F}$ is a non-gravitational interference measurement interval; if the gravity satellite system suppresses non-gravitational interference by low-to-low satellite-to-satellite tracking, $(\Delta t)_{\Delta F}$ is a non-gravitational interference suppression interval.

A maximum value of the pure gravity orbit position error caused by non-gravitational interference $\delta F$ and the inter-satellite distance change rate accumulative error, and a maximum value thereof are corresponded to an accumulative error under a uniformly accelerated rectilinear motion, and an average accumulative error is:

$$(\Delta r)_{\Delta F} = \frac{1}{T_{arc}} \int_0^{T_{arc}} \frac{1}{2}(\Delta F)t^2 dt = \frac{(\Delta F)T_{arc}^2}{6}; \tag{75}$$

$$(\Delta \dot{\rho})_{\Delta F} = \frac{1}{T_{arc}} \int_0^{T_{arc}} (\Delta F)t dt = \frac{(\Delta F)T_{arc}}{2}; \tag{76}$$

wherein Tarc is an integral arc length in the recovery gravity field recovery. The formulas (73)-(76) are substituted into the formula (72) to obtain an error variance:

$$\delta\sigma_n^2 = \frac{1}{2n+1}\sum_{k=0}^{n}\left[(\delta\overline{C}_{nk})^2 + (\delta\overline{S}_{nk})^2\right] = \tag{77}$$

$$\frac{1}{\sum_{k=0}^{n}[B_1(r_0,n,k,\theta_0)+B_2(r_0,n,k,\theta_0)+B_3(r_0,n,k,\theta_0)]} \times$$

$$\frac{1}{2n+1} \frac{2(n+1)r_0^{2n}}{\pi\mu^2 T a_e^{2n-2}} \left[\begin{array}{c} -D\sqrt{\left(\frac{(\Delta F)^2 T_{arc}^2}{4}(\Delta t)_{\Delta F} + \atop (\Delta r)_m^2(\Delta t)_{\Delta r}\right)}f_{\delta r}(n) + \\ \sqrt{\frac{\mu}{r_0}}\sqrt{\left(\frac{(\Delta F)^2 T_{arc}^2}{4}(\Delta t)_{\Delta F} + \atop (\Delta \dot{\rho})_m^2(\Delta t)_{\Delta \dot{\rho}}\right)}f_{\delta\dot{\rho}}(n) \end{array}\right]^2;$$

wherein:

$$\begin{cases} B_1(r_0,n,k,\theta_0) = A_n^2(n-1,k,\theta_0) + \\ \left(\frac{a_e}{r_0}\right)|A_n(n-1,k,\theta_0)A_n(n,k,\theta_0)| + \\ \left(\frac{a_e}{r_0}\right)^2|A_n(n-1,k,\theta_0)A_n(n+1,k,\theta_0)| \\ B_2(r_0,n,k,\theta_0) = \left(\frac{a_e}{r_0}\right)^2 A_n^2(n,k,\theta_0) + \\ \left(\frac{a_e}{r_0}\right)|A_n(n-1,k,\theta_0)A_n(n,k,\theta_0)| + \left(\frac{a_e}{r_0}\right)^3|A_n(n,k,\theta_0)A_n(n+1,k,\theta_0)| \\ B_3(r_0,n,k,\theta_0) = \left(\frac{a_e}{r_0}\right)^4 A_n^2(n+1,k,\theta_0) + \\ \left(\frac{a_e}{r_0}\right)^2|A_n(n-1,k,\theta_0)A_n(n+1,k,\theta_0)| + \\ \left(\frac{a_e}{r_0}\right)^3|A_n(n,k,\theta_0)A_n(n+1,k,\theta_0)| \end{cases} \tag{78}$$

$$A_n(l,k,\theta_0) = \delta_k \int_0^\pi [\overline{P}_{lk}(\cos(\theta+\theta_0)) - \overline{P}_{lk}(\cos\theta)]\overline{P}_{nk}(\cos\theta)\sin\theta d\theta \tag{79}$$

$$\delta_k = \begin{cases} 2, & k=0 \\ 1, & k \neq 0 \end{cases} \tag{80}$$

$$D = K\left(\frac{\cos\frac{\theta_0}{2}}{2} - \frac{4}{3}\right)\frac{\mu\sin\theta_0}{r_0^4} < 0 \tag{81}$$

-continued $$f_{\delta r}(n) = \sum_{k=0}^{n}\int_0^\pi [\overline{P}_{nk}(\cos\theta)]^2\cos^2(\theta+\xi)\sin^2\theta d\theta \tag{82}$$

$$= 2.3562n + 1.1781$$

$$= \frac{3}{8}(2n+1)\pi$$

$$f_{\delta\dot{\rho}}(n) = \sum_{k=0}^{n}\int_0^\pi [\overline{P}_{nk}(\cos\theta)]^2\sin^2\theta d\theta = \left(n+\frac{1}{2}\right)\pi \tag{83}$$

$$r_0 = a_e + h \tag{84}$$

$$K = 1.3476 \times 10^{11} \text{ m}^2, \xi = -\frac{\pi}{2}. \tag{85}$$

Physical parameters in the formulas mentioned above are shown in Table 2.

TABLE 2

| $\delta\sigma_n^2$ | degree error variance | $(\delta\overline{C}_{nk}, \delta\overline{S}_{nk})$ | geopotential coefficient error |
|---|---|---|---|
| $r_0$ | Satellite geocentric range | $\theta_0$ | geocentric vector included angle of two satellite |
| $a_e$ | earth average radius | $\mu$ | gravitation constant of earth |
| h | satellite orbit height | $T_{arc}$ | integral arc length |
| $\Delta F$ | non-gravitational interference | $(\Delta t)_{\Delta F}$ | non-gravitational interference data interval |
| $(\Delta r)_m$ | satellite orbit determining position error | $(\Delta t)_{\Delta r}$ | satellite orbit data sampling interval |
| $(\Delta\dot{\rho})_m$ | inter-satellite range change rate measurement error | $(\Delta t)_{\Delta\dot{\rho}}$ | inter-satellite distance change rate sampling interval |
| T | gravity field measurement service life | | |

5. Performance Calculation of the Gravity Field Measurement by Low-t-Low Satellite-to-Satellite Tracking From the error variance, a valid order of the gravity field measurement, a geoid error and a gravity anomaly error is determined. According to Kaula standard, an degree variance of the earth gravity field model is:

$$\sigma_n^2 = \frac{1}{2n+1}\sum_{k=0}^{n}(\overline{C}_{nk}^2 + \overline{S}_{nk}^2) \approx \frac{1}{2n+1}\frac{1.6 \times 10^{-10}}{n^3}; \tag{86}$$

Wherein the degree error variance $\delta\sigma_n^2$ is an increasing function of an nth order gravity field model, degree variance $\sigma_n^2$ is a decreasing function of n. With the increase of n, when $\delta\sigma_n^2$ is equal to $\sigma_n^2$, a maximum valid order $N_{max}$ of the gravity field recovery is considered to be reached, i.e., $$\delta\sigma_{N_{max}}^2 = \frac{1}{2N_{max}+1}\frac{1.6 \times 10^{-10}}{N_{max}^3}. \tag{87}$$

From the formula (87), a geoid-order error corresponding to an nth order is obtained:

$$\Delta_n = a_e\sqrt{(2n+1)\delta\sigma_n^2} \tag{88};$$

so a gravity-anomaly order error corresponding to the nth order is:

$$\Delta = \sqrt{\sum_{k=2}^{n} (\Delta_k)^2}. \quad (89)$$

From the formula (87), a gravity-anomaly order error corresponding to the nth order is:

$$\Delta g_n = \frac{\mu}{a_e^2}(n-1)\sqrt{(2n+1)\delta\sigma_n^2}; \quad (90)$$

and further, a gravity-anomaly accumulative error corresponding to the nth order is:

$$\Delta g = \sqrt{\sum_{k=2}^{n} (\Delta g_k)^2}. \quad (91)$$

Since the GRACE gravity satellite adopts a gravity field measurement principle by low-to-low satellite-to-satellite tracking, according to system parameters of the GRACE satellite, measurement performances of the GRACE gravity field can be calculated by the method for parsing and calculating performance of satellite gravity field measurement by low-to-low satellite-to-satellite tracking. And then the measurement performance of GRACE is compared with a GRACE gravity measurement value simulated result, so as to verify validity of the present invention.

Figure 3:
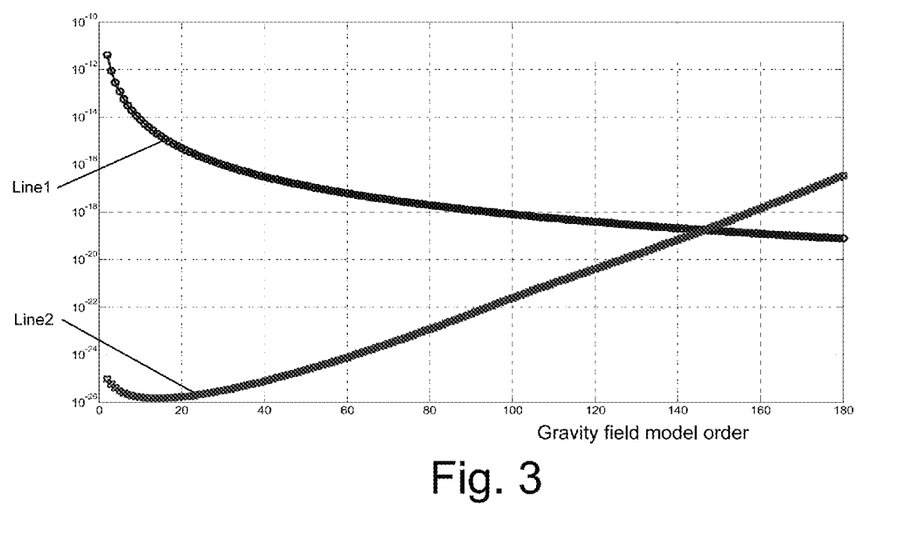
FIG. 3 is a geopotential coefficient degree error variance curve measured in a gravity field under a GRACE system parameter.
Figure 4:
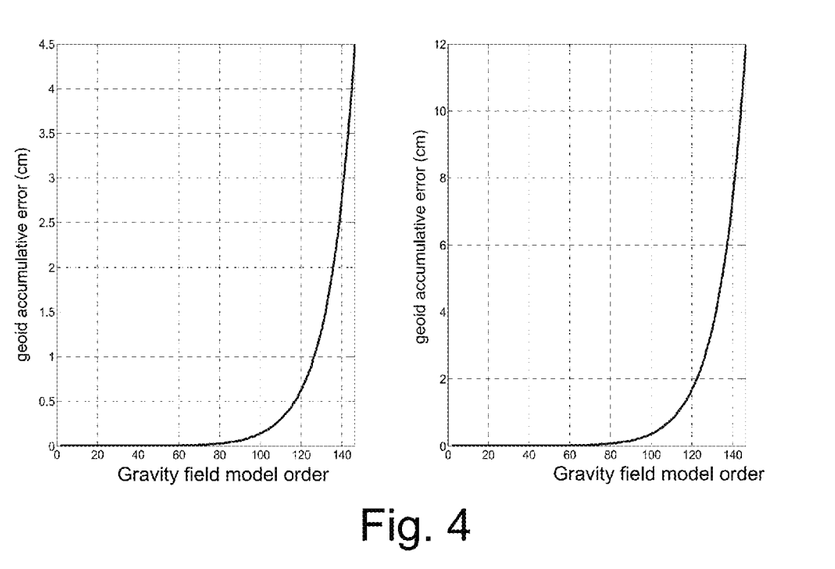
FIG. 4 is a GRACE gravity field measurement geoid order error and a geoid accumulative error.
Figure 5:
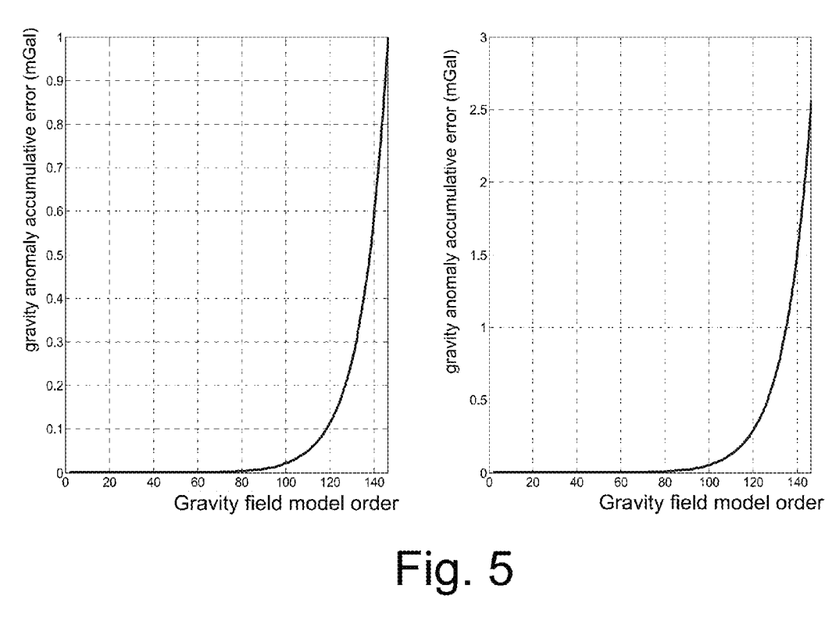
FIG. 5 is a GRACE gravity field measurement degree error of a gravity anomaly error and an accumulative error of gravity anomaly error.

It is known that parameters of GRACE gravity satellite system are shown in Table. 3. The degree error variance, geoid error and gravity anomaly of the gravity field measurement are obtained by the method for parsing and calculating performance of satellite gravity field measurement by low-to-low satellite-to-satellite tracking. As shown in FIGS. 3-5, a valid order of GRACE gravity field measurement by the method of the present invention is 146, which is corresponding to a geoid accumulative error of 11.73 cm and a gravity anomaly accumulative error is 2.51 mGal, which is basically consist with a simulated result of a GRACE gravity field measurement performance value, in such a manner that the method for parsing and calculating performance of satellite gravity field measurement by low-to-low satellite-to-satellite tracking of the present invention is valid.

TABLE 3

| satellite orbit height | 480 km | inter-satellite distance | 220 km |
|---|---|---|---|
| satellite orbit determination error | 5 cm | satellite orbit data sampling interval | 60 s |
| inter-satellite distance change rate measurement error | $1.0 \times 10^{-6}$ m/s | measurement data sampling interval | 60 s |
| non-gravitational interference measurement error | $1.0 \times 0^{-10}$ m/s² | service life designed | 5 year |

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for parsing and calculating performance of satellite gravity field measurement by low-to-low satellite-to-satellite tracking, comprising steps of:

step (1): acquiring at least one parameter of a gravity satellite system by low-to-low satellite-to-satellite tracking by the gravity satellite system;

step (2): according to the parameter of the gravity satellite system by low-to-low satellite-to-satellite tracking, calculating an effect of a measuring error of a gravity satellite load on a power spectrum of a nonspherical perturbation potential of earth gravity, so as to obtain an degree error variance of a potential coefficient in a gravity field recovery model;

step (3): comparing the degree error variance of the potential coefficient in the gravity field recovery model with an degree variance of a potential coefficient given by Kaula Rule, wherein with an increase of an order of the gravity field recovery model, the degree error variance gradually increases and the degree variance gradually decreases; when the degree error variance is equal to the degree variance, considering that a maximum valid order of the gravity field measurement is obtained, wherein the degree error variance, the degree variance and the maximum valid order are obtained by the gravity field model;

step (4): according to the degree error variance of the gravity field recovery model, calculating a geoid-order error, an accumulative error, an gravity-anomaly order error and an accumulative error of the gravity field recovery model, wherein the geoid-order error, the accumulative error, the gravity-anomaly order error and the accumulative error are obtained by the gravity field model; and step (5): summarizing the valid degree of the gravity field measurement, the geoid-order error, the accumulative error, the gravity-anomaly order error and the accumulative error, so as to obtain the performance of satellite gravity field measurement by low-to-low satellite-to-satellite tracking, wherein the valid degree of the gravity field measurement, the geoid-order error, the accumulative error, the gravity-anomaly order error and the accumulative error are obtained by the gravity field model;

wherein the parameter of the gravity satellite system by low-to-low satellite-to-satellite tracking comprises but not limited to at least one orbit parameter of the gravity satellite system and at least one load indicator of the gravity satellite system;

wherein the orbit parameter of the gravity satellite system comprises at least one member of: a maximum valid order of the gravity field recovery $N_{max}$, a gravity-anomaly order error $\Delta_n$ of an nth order, a geoid-order accumulative error $\Delta$ of the nth order, a gravity-anomaly order error $\Delta g_n$ of the nth order and a gravity-anomaly accumulative error $\Delta g$ of the nth order, wherein $N_{max}$, $\Delta_n$, $\Delta$, $\Delta g_n$ and $\Delta g$ are obtained by the gravity field model;

the parameter of the gravity satellite system comprises: a gravity satellite orbit height h and an included angle $\theta_0$ of satellite-to-satellite geocentric vectors, wherein h and $\theta_0$ are obtained by the gravity satellite system, the load indicator of the gravity satellite system comprises: an inter-satellite range change rate measurement error $(\Delta\dot{\rho})_m$, a satellite orbit determining position error $(\Delta r)_m$, a non-gravitational interference $\Delta F$, an inter-satellite range rate data sampling interval $(\Delta t)_{\Delta\dot\rho}$, a non-gravitational interference data interval $(\Delta t)_{\Delta F}$, satellite orbit position data sampling interval $(\Delta t)_{\Delta r}$ and a gravity field measurement service life T, wherein $(\Delta\dot\rho)_m$ is obtained by an inter-satellite range measurement device, $(\Delta r)_m$ is obtained by a spaceborne GPS system, and the $\Delta F$ is obtained by an accelerometer, wherein the inter-satellite range measurement device, the spaceborne GPS system and the accelerometer are conventional and all provided on the gravity satellite system; wherein the step (2) specifically comprises steps of:

establishing an analytic formula of a low-to-low satellite-to-satellite tracking gravity field measurement degree error variance $\delta\sigma_n^2$ of a potential coefficient:

$$\delta\sigma_n^2 = \frac{1}{2n+1}\sum_{k=0}^{n}\left[(\delta\overline{C}_{nk})^2 + (\delta\overline{S}_{nk})^2\right] =$$

$$\frac{1}{\sum_{k=0}^{n}[B_1(r_0,n,k,\theta_0)+B_2(r_0,n,k,\theta_0)+B_3(r_0,n,k,\theta_0)]} \times \frac{1}{2n+1}$$

$$\frac{2(n+1)r_0^{2n}}{\pi\mu^2 T a_e^{2n-2}}\left[-D\sqrt{\left(\frac{(\Delta F)^2 T_{arc}^4}{36}(\Delta t)_{\Delta F}+(\Delta r)_m^2(\Delta t)_{\Delta r}\right)f_{\delta r}(n)} + \sqrt{\frac{\mu}{r_0}}\sqrt{\left(\frac{(\Delta F)^2 T_{arc}^2}{4}(\Delta t)_{\Delta F}+(\Delta\dot\rho)_m^2(\Delta t)_{\Delta\dot\rho}\right)f_{\delta\dot\rho}(n)}\right]^2$$

wherein:

$$\begin{cases}B_1(r_0,n,k,\theta_0) = A_n^2(n-1,k,\theta_0) + \left(\frac{a_e}{r_0}\right)|A_n(n-1,k,\theta_0)A_n(n,k,\theta_0)| + \\ \qquad\left(\frac{a_e}{r_0}\right)^2|A_n(n-1,k,\theta_0)A_n(n+1,k,\theta_0)| \\ B_2(r_0,n,k,\theta_0) = \left(\frac{a_e}{r_0}\right)^2 A_n^2(n,k,\theta_0) + \\ \left(\frac{a_e}{r_0}\right)|A_n(n-1,k,\theta_0)A_n(n,k,\theta_0)| + \left(\frac{a_e}{r_0}\right)^3|A_n(n,k,\theta_0)A_n(n+1,k,\theta_0)| \\ B_3(r_0,n,k,\theta_0) = \left(\frac{a_e}{r_0}\right)^4 A_n^2(n+1,k,\theta_0) + \\ \left(\frac{a_e}{r_0}\right)^2|A_n(n-1,k,\theta_0)A_n(n+1,k,\theta_0)| + \left(\frac{a_e}{r_0}\right)^3|A_n(n,k,\theta_0)A_n(n+1,k,\theta_0)|\end{cases}$$

$$A_n(l,k,\theta_0) = \delta_k\int_0^\pi [\overline{P}_{lk}(\cos(\theta+\theta_0)) - \overline{P}_{lk}(\cos\theta)]\overline{P}_{nk}(\cos\theta)\sin\theta d\theta$$

$$\delta_k = \begin{cases}2, & k=0 \\ 1, & k\neq 0\end{cases}$$

$$D = K\left(\frac{\cos\frac{\theta_0}{2}}{2} - \frac{4}{3}\right)\frac{\mu\sin\theta_0}{r_0^4}$$

$$f_{\delta r}(n) = \sum_{k=0}^{n}\int_0^\pi [\overline{P}_{nk}(\cos\theta)]^2\cos^2(\theta+\xi)\sin^2\theta d\theta = \frac{3}{8}(2n+1)\pi$$

$$f_{\delta\dot\rho}(n) = \left(n+\frac{1}{2}\right)\pi$$

$$r_0 = a_e + h$$

wherein $\delta\sigma_n^2$ is an degree error variance of a geopotential coefficient of the gravity field recovery model, $r_0$ is a geocentric range of a satellite, $\theta_0$ is a geocentric vector included angle, $a_e$ is an earth average radius, $\mu$ is a product of a gravitation constant and an earth mass, h is the gravity satellite orbit height, $T_{arc}$ is an integral arc length, $\Delta F$ is non-gravitational interference, $(\Delta t)_{\Delta F}$ is non-gravitational interference data interval, $(\Delta r)_m$ is a satellite orbit determination position error, $(\Delta t)_{\Delta r}$ is a satellite orbit data sampling interval, $(\Delta\dot\rho)_m$ is an inter-satellite range change rate measurement error, $(\Delta t)_{\Delta\dot\rho}$ is an inter-satellite range change rate sampling interval, T is the gravity field measurement service life, wherein $(\Delta\dot\rho)_m$ and $(\Delta t)_{\Delta\dot\rho}$ are obtained by the inter-satellite range measurement device, $(\Delta r)_m$ and $(\Delta t)_{\Delta r}$ are obtained by the spaceborne GPS system, $\Delta F$ and $(\Delta t)_{\Delta F}$ are obtained by the accelerometer;

$\overline{P}_{nm}(x)$ is the fully normalized associated Legendre polynomial, where n is the degree, m is the order, and x is a specific input $$\overline{P}_{nm}(x) = \sqrt{(2n+1)k\frac{(n-m)!}{(n+m)!}}\, P_{nm}(x),\, k = \begin{cases}1, m=0 \\ 2, m\neq 0\end{cases}$$

$P_{nm}(x)$ is the associated Legendre polynomial, where n is the degree, m is the order, and x is a specific input;

$$P_{nm}(x) = \frac{(-1)^m}{2^n n!}(1-x^2)^{m/2}\frac{d^{n+m}}{dx^{n+m}}(x^2-1)^n$$

$\overline{C}_{nm}$ and $\overline{S}_{nm}$ are cosine and sine terms of normalized gravitational coefficients in a gravity field model, respectively, $\delta\overline{C}_{nm}$ or $\delta\overline{S}_{nm}$ is a measure of difference between the observed value of gravitational coefficient and the theoretical value, n is the degree, and m is the order.

2. The method for parsing and calculating performance of satellite gravity field measurement by low-to-low satellite-to-satellite tracking, as recited in claim 1, wherein a value of a coefficient K and a phase $\xi$ is respectively:

$$K = 1.3476\times 10^{11}\text{ m}^2,\, \xi = -\frac{\pi}{2}.$$

3. The method for parsing and calculating performance of satellite gravity field measurement by low-to-low satellite-to-satellite tracking, as recited in claim 1, wherein regarding to the non-gravitational interference data interval $(\Delta t)_{\Delta F}$, if the gravity satellite system measures non-gravitational interference by low-to-low satellite-to-satellite tracking, $(\Delta t)_{\Delta F}$ is a non-gravitational interference measurement interval; if the gravity satellite system suppresses non-gravitational interference by low-to-low satellite-to-satellite tracking, $(\Delta t)_{\Delta F}$ is a non-gravitational interference suppression interval.

4. The method for parsing and calculating performance of satellite gravity field measurement by low-to-low satellite-to-satellite tracking, as recited in claim 1, wherein the step (3) specifically comprises a step of establishing a maximum valid order $N_{max}$ of the gravity field measurement, which meets a formula of:

$$\delta\sigma_{N_{max}}^2 = \frac{1}{2N_{max}+1}\frac{1.6\times 10^{-10}}{N_{max}^3}$$

wherein $N_{max}$ is obtained by the gravity field model.

5. The method for parsing and calculating performance of satellite gravity field measurement by low-to-low satellite-to-satellite tracking, as recited in claim 1, wherein the step (4) specifically comprises:

establishing the geoid-order error corresponding to an nth degree:

$$\Delta_n = a_e \sqrt{(2n+1)\delta\sigma_n^2},$$

and/or establishing the geoid accumulative error corresponding to the nth degree:

$$\Delta = \sqrt{\sum_{k=2}^{n}(\Delta_k)^2},$$

and/or establishing the gravity-anomaly order error corresponding to the nth degree:

$$\Delta g_n = \frac{\mu}{a_e^2}(n-1)\sqrt{(2n+1)\delta\sigma_n^2};$$

and/or establishing the gravity-anomaly accumulative error corresponding to the nth degree:

$$\Delta g = \sqrt{\sum_{k=2}^{n}(\Delta g_k)^2}.$$

* * * * *